(12) United States Patent
Hall

(10) Patent No.: US 9,071,451 B2
(45) Date of Patent: Jun. 30, 2015

(54) GEOCAST-BASED SITUATION AWARENESS

(75) Inventor: Robert J. Hall, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 251 days.

(21) Appl. No.: 13/563,429

(22) Filed: Jul. 31, 2012

(65) Prior Publication Data

US 2014/0038511 A1  Feb. 6, 2014

(51) Int. Cl.
*H04H 20/71* (2008.01)
*H04L 12/18* (2006.01)
*H04W 40/02* (2009.01)
*H04W 40/20* (2009.01)

(52) U.S. Cl.
CPC ........... *H04L 12/189* (2013.01); *H04W 40/023* (2013.01); *H04W 40/20* (2013.01)

(58) Field of Classification Search
CPC ....... G06Q 3/0241; G06Q 50/01; H04L 12/18
USPC .............................. 455/404.1, 421, 11.1, 13.1
See application file for complete search history.

(56) References Cited

U.S. PATENT DOCUMENTS

| 6,015,344 A | 1/2000 | Kelly et al. |
| 6,119,976 A | 9/2000 | Rogers |
| 6,195,751 B1 | 2/2001 | Caronni et al. |
| 6,304,556 B1 | 10/2001 | Haas |
| 6,428,470 B1 | 8/2002 | Thompson |
| 6,628,620 B1 | 9/2003 | Cain |
| 6,781,971 B1 | 8/2004 | Davis et al. |
| 6,807,165 B2 | 10/2004 | Belcea |
| 6,816,460 B1 | 11/2004 | Ahmed et al. |
| 6,870,846 B2 | 3/2005 | Cain |
| 6,879,574 B2 | 4/2005 | Naghian et al. |
| 6,909,706 B2 | 6/2005 | Wilmer et al. |
| 6,937,602 B2 | 8/2005 | Whitehill et al. |
| 6,940,832 B2 | 9/2005 | Saadawi et al. |
| 6,954,435 B2 | 10/2005 | Billhartz et al. |

(Continued)

FOREIGN PATENT DOCUMENTS

WO   WO 2007/016641 A2   2/2007

OTHER PUBLICATIONS

U.S. Appl. No. 13/683,025, filed Nov. 21, 2012, Panta.

(Continued)

*Primary Examiner* — Tu X Nguyen
(74) *Attorney, Agent, or Firm* — Baker & Hostetler LLP

(57) ABSTRACT

Geocast-based situation awareness utilizing a scalable, distributed ad hoc geocast protocol as a communication primitive, may provide a field common operating picture (FCOP) for providing location tracking, movement history, telemetry, and messaging in near real time to all operators in a scenario. Information may be transferred using a query/response geocast message protocol. Caching on devices may be utilized to gain scalability. A query message may have a payload containing a type indication and a header containing a description of a geocast region of intended reception, which may comprise the monitored region, the location of the monitorer, or any appropriate combination thereof. Response messages may be sent from devices located in the monitored region to an area containing the location of the sender of a query. A response message may contain monitored information, such as current location, telemetry data, and/or recent movement history, or the like.

17 Claims, 18 Drawing Sheets

(56) References Cited

U.S. PATENT DOCUMENTS

| | | |
|---|---|---|
| 6,958,986 B2 | 10/2005 | Cain |
| 7,027,822 B1 | 4/2006 | Hwang et al. |
| 7,152,110 B2 | 12/2006 | Pierce |
| 7,179,166 B1 | 2/2007 | Abbott |
| 7,197,326 B2 | 3/2007 | Acampora |
| 7,295,521 B2 | 11/2007 | Choi et al. |
| 7,307,978 B2 | 12/2007 | Carlson |
| 7,525,933 B1 | 4/2009 | Hall |
| 7,540,028 B2 | 5/2009 | Ahmed et al. |
| 7,613,467 B2 | 11/2009 | Fleischman |
| 7,669,052 B2 | 2/2010 | Asano et al. |
| 7,813,326 B1 | 10/2010 | Kelm et al. |
| 7,864,168 B2 | 1/2011 | French |
| 7,917,169 B1 | 3/2011 | Hall |
| 7,969,914 B1 | 6/2011 | Gerber |
| 7,970,749 B2 | 6/2011 | Uhlir et al. |
| 8,073,327 B2 | 12/2011 | Mayer |
| 8,085,813 B2 | 12/2011 | Melick et al. |
| 8,128,405 B2 | 3/2012 | Preston et al. |
| 8,149,801 B2 | 4/2012 | Hall |
| 8,218,463 B2 | 7/2012 | Hall |
| 8,248,367 B1 | 8/2012 | Barney et al. |
| 8,332,544 B1 | 12/2012 | Ralls et al. |
| 8,341,271 B2 | 12/2012 | Cho et al. |
| 8,359,643 B2 | 1/2013 | Low et al. |
| 8,376,857 B1 | 2/2013 | Shuman et al. |
| 8,483,652 B2 | 7/2013 | Hall |
| 8,599,848 B2 | 12/2013 | Janneteau |
| 2001/0014094 A1 | 8/2001 | Epley |
| 2002/0113872 A1 | 8/2002 | Kinjo |
| 2002/0141454 A1 | 10/2002 | Muniere |
| 2002/0155846 A1 | 10/2002 | Shiraga |
| 2002/0163912 A1 | 11/2002 | Carlson |
| 2002/0167960 A1 | 11/2002 | Garcia-Luna-Aceves |
| 2002/0169971 A1 | 11/2002 | Asano et al. |
| 2003/0074413 A1 | 4/2003 | Nielsen et al. |
| 2003/0105956 A1 | 6/2003 | Ishiguro et al. |
| 2003/0193394 A1 | 10/2003 | Lamb |
| 2003/0235158 A1 | 12/2003 | Lee |
| 2004/0083385 A1 | 4/2004 | Ahmed et al. |
| 2004/0121792 A1 | 6/2004 | Allen et al. |
| 2004/0151144 A1 | 8/2004 | Benveniste |
| 2004/0185881 A1 | 9/2004 | Lee et al. |
| 2004/0213270 A1 | 10/2004 | Su et al. |
| 2005/0036448 A1 | 2/2005 | Leeuwen |
| 2005/0058151 A1 | 3/2005 | Yeh |
| 2005/0086350 A1 | 4/2005 | Mai |
| 2005/0096065 A1 | 5/2005 | Fleischman |
| 2005/0152318 A1 | 7/2005 | Elbatt et al. |
| 2005/0152378 A1 | 7/2005 | Bango et al. |
| 2005/0243788 A1 | 11/2005 | Janczak |
| 2005/0254453 A1 | 11/2005 | Barneah |
| 2005/0259597 A1 | 11/2005 | Benedetto |
| 2006/0013154 A1 | 1/2006 | Choi et al. |
| 2006/0023677 A1 | 2/2006 | Labrador |
| 2006/0084444 A1 | 4/2006 | Kossi et al. |
| 2006/0126535 A1 | 6/2006 | Sherman |
| 2006/0128349 A1 | 6/2006 | Yoon |
| 2006/0148516 A1 | 7/2006 | Reddy et al. |
| 2006/0153157 A1 | 7/2006 | Roh et al. |
| 2006/0165015 A1 | 7/2006 | Melick et al. |
| 2006/0227787 A1 | 10/2006 | Furlong et al. |
| 2007/0008925 A1 | 1/2007 | Dravida et al. |
| 2007/0019591 A1 | 1/2007 | Chou et al. |
| 2007/0019594 A1 | 1/2007 | Perumal et al. |
| 2007/0104096 A1 | 5/2007 | Ribera |
| 2007/0110092 A1 | 5/2007 | Kangude et al. |
| 2007/0180533 A1 | 8/2007 | Ramaiah et al. |
| 2007/0198731 A1 | 8/2007 | Li et al. |
| 2007/0217346 A1 | 9/2007 | Zheng et al. |
| 2007/0259716 A1 | 11/2007 | Mattice et al. |
| 2007/0259717 A1 | 11/2007 | Mattice et al. |
| 2007/0263571 A1 | 11/2007 | Hermann et al. |
| 2007/0265088 A1 | 11/2007 | Nakada et al. |
| 2007/0265089 A1 | 11/2007 | Robarts et al. |
| 2007/0266396 A1 | 11/2007 | Estermann |
| 2007/0283001 A1 | 12/2007 | Spiess et al. |
| 2007/0287437 A1 | 12/2007 | Cartmell |
| 2008/0015024 A1 | 1/2008 | Mullen |
| 2008/0039113 A1 | 2/2008 | Liu et al. |
| 2008/0058099 A1 | 3/2008 | Schwartz et al. |
| 2008/0080401 A1 | 4/2008 | Ribiere |
| 2008/0144493 A1 | 6/2008 | Yeh |
| 2008/0147854 A1 | 6/2008 | Van Datta et al. |
| 2008/0159236 A1 | 7/2008 | Ch'ng et al. |
| 2008/0163355 A1 | 7/2008 | Chu |
| 2008/0186206 A1 | 8/2008 | Reumerman |
| 2008/0192737 A1 | 8/2008 | Miyazaki |
| 2008/0262928 A1 | 10/2008 | Michaelis |
| 2009/0017913 A1 | 1/2009 | Bell et al. |
| 2009/0030605 A1 | 1/2009 | Breed |
| 2009/0041039 A1 | 2/2009 | Bear |
| 2009/0045977 A1 | 2/2009 | Bai et al. |
| 2009/0046628 A1 | 2/2009 | Hall |
| 2009/0073912 A1 | 3/2009 | Bauchot et al. |
| 2009/0122753 A1 | 5/2009 | Hughes et al. |
| 2009/0138353 A1 | 5/2009 | Mendelson |
| 2009/0175223 A1 | 7/2009 | Hall |
| 2009/0201860 A1 | 8/2009 | Sherman et al. |
| 2009/0207783 A1 | 8/2009 | Choi et al. |
| 2009/0245518 A1 | 10/2009 | Bae et al. |
| 2009/0248420 A1 | 10/2009 | Basir |
| 2009/0292926 A1 | 11/2009 | Daskalopoulos et al. |
| 2009/0298461 A1 | 12/2009 | O'Reilly |
| 2009/0323579 A1 | 12/2009 | Bai et al. |
| 2009/0325603 A1 | 12/2009 | Van Os et al. |
| 2010/0008259 A1 | 1/2010 | Yoon et al. |
| 2010/0029245 A1 | 2/2010 | Wood et al. |
| 2010/0042601 A1 | 2/2010 | Kelley et al. |
| 2010/0060480 A1 | 3/2010 | Bai et al. |
| 2010/0064307 A1 | 3/2010 | Malhotra et al. |
| 2010/0067451 A1 | 3/2010 | Hall |
| 2010/0069109 A1 | 3/2010 | Hall |
| 2010/0074234 A1 | 3/2010 | Banks et al. |
| 2010/0082513 A1 | 4/2010 | Liu |
| 2010/0128653 A1 | 5/2010 | Tateson |
| 2010/0150129 A1 | 6/2010 | Jin et al. |
| 2010/0162149 A1 | 6/2010 | Sheleheda et al. |
| 2010/0169009 A1 | 7/2010 | Breed et al. |
| 2010/0214987 A1 | 8/2010 | Mori |
| 2010/0215040 A1 | 8/2010 | Kappler et al. |
| 2010/0226342 A1 | 9/2010 | Coiling et al. |
| 2010/0235633 A1 | 9/2010 | Asano et al. |
| 2010/0245124 A1 | 9/2010 | Bai et al. |
| 2010/0248618 A1 | 9/2010 | Bai et al. |
| 2010/0248843 A1 | 9/2010 | Karsten |
| 2010/0250106 A1 | 9/2010 | Bai et al. |
| 2010/0250346 A1 | 9/2010 | Bai et al. |
| 2010/0253547 A1 | 10/2010 | Tenetylo |
| 2010/0279776 A1 | 11/2010 | Hall |
| 2010/0287011 A1 | 11/2010 | Muchkaev |
| 2010/0304759 A1 | 12/2010 | Leppanen et al. |
| 2010/0329463 A1 | 12/2010 | Ratliff et al. |
| 2011/0002243 A1 | 1/2011 | Sherman et al. |
| 2011/0081973 A1 | 4/2011 | Hall |
| 2011/0102459 A1 | 5/2011 | Hall |
| 2011/0103302 A1 | 5/2011 | Hall |
| 2011/0105151 A1 | 5/2011 | Hall |
| 2011/0177829 A1 | 7/2011 | Platt et al. |
| 2011/0191425 A1 | 8/2011 | Brodeur et al. |
| 2011/0201369 A1 | 8/2011 | Kim et al. |
| 2011/0230202 A1 | 9/2011 | Wood et al. |
| 2011/0244887 A1 | 10/2011 | Dupray et al. |
| 2011/0299685 A1 | 12/2011 | Hall |
| 2012/0016940 A1 | 1/2012 | Hall |
| 2012/0058814 A1 | 3/2012 | Lutnick et al. |
| 2012/0079080 A1 | 3/2012 | Pishevar |
| 2012/0084364 A1 | 4/2012 | Sivavakeesar |
| 2012/0094770 A1 | 4/2012 | Hall |
| 2012/0108326 A1 | 5/2012 | Hall |
| 2012/0128010 A1 | 5/2012 | Huang et al. |
| 2012/0157210 A1 | 6/2012 | Hall |
| 2014/0082369 A1 | 3/2014 | Waclawsky et al. |
| 2014/0100027 A1 | 4/2014 | Harris et al. |

(56) References Cited

U.S. PATENT DOCUMENTS

OTHER PUBLICATIONS

U.S. Appl. No. 13/712,353, filed Dec. 12, 2012, Hall.
Aggarwal, Sudhir et al., "Accuracy in dead reckoning based distributed multi-player games", SIGCOMM '04 Workshops, (Proceedings of 3rd ACM SIGCOMM Workshop on Network and System Support for Games), Aug. 30-Sep. 3, 2004, Portland, Oregon, pp. 161-165.
Bjerver, Martin, "Player Behaviour in Pervasive Games—using the City as a Game Board in Botfighters", Master of Science Thesis, KTH Computer Science and Communication, Stockholm, Sweden, 2006.
Bzflag(6):tank battle game—linux man page, Google date Feb. 1, 2001, downloaded from http://linux.die.net/man/6/bzflag.
de Souza e Silva, Adriana, "Alien revolt (2005-2007): A case study of the first location-based mobile game in Brazil", IEEE Technology and Society Magazine, Spring 2008, pp. 18-28.
Dialogic, "Adding location based services to existing architectures", Application Note: Location-Based Services, 9862-02, Oct. 2007, 14 pages, downloaded from http://www.dialogic.com/-/media/products/docs/signaling-and-ss7-components/9862_Add_Locationbased_Servs_an.pdf.
Gallagher, Sean, "Army prepares test of new wireless war game gear", Defense Systems, Jul. 7, 2008, downloaded from http://defensesystems.com/articles/2008/07/army-prepares-test-of-new-wireless-war-game-gear.aspx.
Halas, Jacek, "Ghost Recon: Advanced Warfighter Game Guide, [Mission 01] Contact!—Objective: Locate Ramirez with the Drone", 2007, downloaded from http://guides.gamepressure.com/ghostreconadvancedwarfighter/guide.asp?ID=986.
Hohfeld, Alexander, "In and out of reality: Janus-faced location awareness in ubiquitous games", Journal of Software, 2(6), Dec. 2007, 86-92.
Kim, Seong-Whan et al., "Kalman filter based dead reckoning algorithm for minimizing network traffic between mobile nodes in wireless Grid", Embedded and Ubiquitous Computing, Lecture Notes in Computer Science, 4096, 2006, 162-170.
Lindo, Wayne A. et al., "Network modeling and simulation in the OneTESS program", Fall Simulation Interoperability Workshop 2006, Orlando, Florida, USA, Sep. 10-15, 2006, 155ff.
MyCheats web page, "Ghost Recon: Advanced Warfighter Superguide, Reach Ramirez", (Jul. 19, 2006), downloaded from http://mycheats.1up.com/view/section/3139558/18404/ghost_recon_advanced_warfighter/pc.
Santos, Nuno et al., "Vector-field consistency for ad-hoc gaming", Middleware 2007, LNCS 4834, 2007, pp. 80-100.
Sotamaa, Olli, "All the world's a Botfighter Stage: Notes on location-based multi-user gaming", Proceedings of Computer Games and Digital Cultures Conference, Tampere University Press, 2002, pp. 35-44.
U.S. Appl. No. 11/264,834, filed Nov. 1, 2005, Hall.
U.S. Appl. No. 13/169,892, filed Jun. 27, 2011, Hall.
U.S. Appl. No. 13/169,829, filed Jun. 27, 2011, Hall.
U.S. Appl. No. 13/277,895, filed Oct. 20, 2011, Jana.
U.S. Appl. No. 13/327,472, filed Dec. 15, 2011, Hall.
"Boost Mobile Introduces First Location-based, GPS games in US" http://www.physorg.com/news5824.html (Aug. 16, 2005).
Location-Enabled Mobile Gaming; http://www.nn4d.com/site/global/market/affiliate_sites/lbsglobe/lbsapplications/mobilegaming.jsp (2007).
"Sony bigwig hints at GPS-enabled PSP games"; http:www.vespacious.com/sony-bigwig-hints-at-gps-enabled-psp-games.html (Dec 22, 2008).
Balasubramaniam, et al. "Interactive WiFi Connectivity for Moving Vehicles," Proceedings of SIGCOMM, Aug. 17-22, 2008, 12 pages.
Corbett, et al. "A Partitioned Power and Location Aware MAC Protocol for Mobile Ad Hoc Networks," Technical Report No. 553, University of Sydney, School of Information Technologies, Jul. 2004, 7 pages.

Das, et al., "SPAWN: A Swarming Protocol for Vehicular Ad-Hoc Wireless Networks," Proceedings of $1^{st}$ ACM Vanet, Oct. 2004, 2 pages.
Eriksson, et al., "Cabernet: Vehicular Content Delivery Using WiFi," Proceedings of Mobicom, Sep. 2008, 12 pages.
German Aerospace Center, Simulation of Urban Mobility, 2010, http://sumo.sourceforgenet, 1 page.
Gupta, et al., "The Capacity of Wireless Networks," IEEE Transactions on Information Theory, 46(2), Mar. 2000, 17 pages.
Hadaller, et al., "Vehicular Opportunistic Communication Under the Microscope," Proceedings of MobiSys, Jun. 11-14, 2007, 206-219.
Hall et al., "A Two-Level Quality of Service Scheme for Collision based on Mobile Ad Hoc Networks", IEEE, Military Communications Conference, 1-4244-1513-06/07, Oct. 2007, 8 pages.
Hall, "An Improved Geocast for Mobile Ad Hoc Networking," IEEE Transactions on Mobile Computing, 2010, 1-14.
Hall, "Cheating Attacks and Resistance Techniques in Geogame Design," Proc. 2010 ACM FuturePlay Symposium, 2010, 82-89.
Hall, "RTEQ: Modeling and Validating Infinite-State Hard-Real-Time Systems", AT&T Labs Research, ASE 2007, Nov. 2007, 4 pages.
Hall, et al., "A Tiered Geocast Protocol for Long Range Mobile Ad Hoc Networking," Proceedings of the 2006 IEEE Military Communications Conf., 2006, 8 pages.
Heissenbüttel, et al., "BLR: Beacon-Less Routing Algorithm for Mobile Ad-Hoc Networks," Elsevier's Computer Communications Journal, 27, 2003, 15 pages.
http://askville.amazon.com/Wii-games-play-Internet-Family/AnswerViewer.do?requestId=6796582, 2007.
Hull, et al., "CarTel: A Distributed Mobile Sensor Computing System," Proceedings of ACM SenSys, Nov. 2006, 14 pages.
Ilyas, M., Ed., "Body Personal, and Local Ad Hoc Wireless Networks", Chapter 1, CRC Press, 2003, 22 pages.
Karp, et al, "GPSR: Greedy Perimeter Stateless Routing for Wireless Networks," Proceedings of Mobicom, 2000, ACM 2000, 12 pages.
Ko et al., "Geocasting in Mobile Ad Hoc Networks: Location-based Multicast Algorithms", Technical Report TR-98-018 Texas A&M University, Sep. 1998, 10 pages.
Ko, et al., "Flooding-Based Geocasting Protocols for Mobile Ad Hoc Networks," Mobile Networks and Applications, Dec. 2002, 7, 471-480.
Kuhn, et al., "Geometric Ad-Hoc Routing: Of Theory and Practice," Proc. 2003 Symposium on Principles of Distributed Computing, ACM 2003, 10 pages.
Lee, et al., "CarTorrent: A Bit-Torrent System for Vehicular Ad-Hoc Networks," Mobile Networking for Vehicular Environments, Sep. 2007, 6 pages.
Lee, et al., "Efficient Geographic Routing in Multihop Wireless Networks," Proc. MobiHoc 2005, ACM, 2005, 12 pages.
Liao et al., "GRID: A Fully Location-Aware Routing Protocol for Mobile Ad Hoc Networks", Telecommunication Systems, 2001, 18, pp. 1-26.
Maihofer, "A Survey of Geocast Routing Protocols," IEEE Communications Surveys, Jun. 2004, 32-42.
Manvi, et al., "Performance Analysis of AODV, DSR, and Swarm Intelligence Routing Protocols in Vehicular Ad Hoc Network Environment," Proceedings of IEEE Future Computer and Communications, Apr. 2009, 21-25.
Ni, et al., "The Broadcast Storm Problem in a Mobile Ad Hoc Network," Proceedings of the $5^{th}$ Annual ACM/IEEE International Conference on Mobile Computing and Networking, ACM, 1999, 151-162.
Niculescu, et al., "Trajectory Based Forwarding and Its Applications," Proc. Mobicom 2003, ACM, 2003, 13 pages.
Ns-2, "The Network Simulator," 2010, http://isi.edu/nsnam/ns, 2 pages.
Panta, "GeoV2V: Vehicular Communications Using a Scalable Ad Hoc Geocast Protocol," AT&T Labs Research, 14 pages.
Schutzberg, "Phone-based GPS-based Games: Missing Pieces"; http://www.directionsmag.com/articlephp?article_id=939 (Aug. 17, 2005).

(56) References Cited

OTHER PUBLICATIONS

Schwingenschlogl, "Geocast Enhancements of AODV for Vehicular Networks," ACM SIGMOBILE Mobile Computing and Communications Review, Jun. 2002, 18 pages.

Shevade, et al., "Enabling High-Bandwidth Vehicular Content Distribution," Proceedings of CoNEXT 2010, Nov. 30-Dec. 3, 2010, 12 pages.

Shih et al., A Distributed Slots Reservation Protocol for QoS Routing on TDMA-based Mobile Ad Hoc Networks, 2004, (ICON 2004), Proceedings, $12^{th}$ IEEE International Conference, Nov. 2004, 2, 660-664.

Shih et al., "CAPC: A Collision Avoidance Power Control MAC Protocol for Wireless Ad Hoc Networks", IEEE Communications Letters, Sep. 2005, 9(9), 859-861.

Social + Gaming—SWiK: http://swik.net/social+ gaming.

Steve:"GPS-enabled Cell Phone Games" http://www.strangenewproducts.com/2005/08/gps-enabled-cell-phone-games.html (Aug. 15, 2005).

Tseng et al., "Fully Power-Aware and Location-Aware Protocols for Wireless Multi-hop Ad Hoc Networks", Proc. of IEEE Intl. Conference on Computer Communications and Networks (ICCCn), 2002, 6 pages.

Yassein, et al., "Performance Analysis of Adjusted Probabilistic Broadcasting in Mobile Ad Hoc Networks," Proc. $11^{th}$ Intl. Conf. on Parallel and Distributed Systems Workshops, 2005, 27 pages.

Zahn, et al., "Feasibility of Content Dissemination Between Devices in Moving Vehicles," Proceedings of CoNEXT 2009, Dec. 1-4, 2009, 11 pages.

Zorzi, et al., "Geographic Random Forwarding (GeRaF) for Ad Hoc and Sensor Networks: Multihop Peformance," IEEE Transactions on Mobile Computing, Dec. 2003, 11 pages.

Various Authors, The Wikipedia page for the "snake" computer game, Nov. 3, 2008 version, Wikipedia.com, downloaded by the USPTO from http://en.wikipedia.org/w/index.php?title=Snake_(video_game)&oldid=249370716 on Oct. 4, 2012.

U.S. Appl. No. 13/875,735, filed May 2, 2013, Hall.

U.S. Appl. No. 13/890,423, filed May 9, 2013, Hall.

Nicklas, Daniela, and Bernhard Mitschang. "On building location aware applications using an open platform based on the Nexus Augmented World Model." Software and Systems Modeling 3.4 (2004): 303-313.

Nintendo, The computer game "Mario Kart DS", released in North America on Nov. 14, 2005, published by Nintendo, as evidenced by the game FAQ by Alex, downloaded from http://db.gamefaqs.com/portable/ds/file/mario_kart_ds_h.txt, with a game FAQ reported upload date of Jul. 15, 2007, p. 11.

Winkler, The computer game "GPS::Tron", as evidenced by the Ars Electronica organization archive document http://archive.aec.at!submission/2004/U19/1043/, where the document has an earliest archive.org verified publication date May 4, 2005, pp. 1-2.

Winkler, Additional date evidence for the Ars Electronica organization archive document http://archive.aec.at/submission/2004/U19/1043/, retrieved from http://web.archive.org/web/20050508084628/http://www.aec.at/en/archives/prix_archive/prix_project.asp?iProjectID=12899.

Panta, "GeoV2V: Vehicular Communications Using a Scalable Ad Hoc Geocast Protocol," AT&T Labs Research, Nov. 2011, 14 pages.

Social + Gaming—SWiK: http://swik.net/social+ gaming, 2009.

U.S. Appl. No. 14/279,441, filed Jul. 30, 2014, Hall.

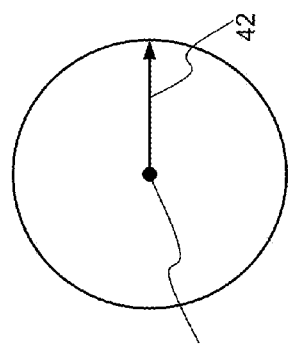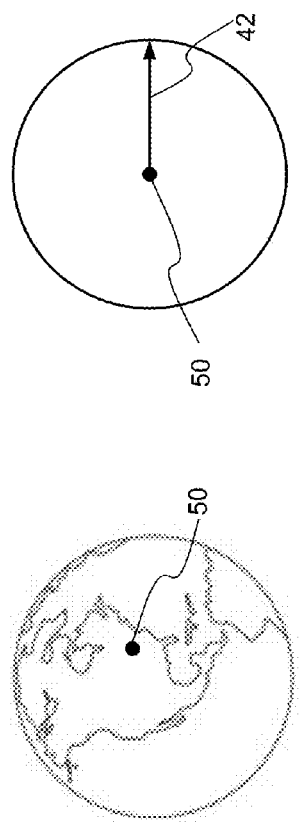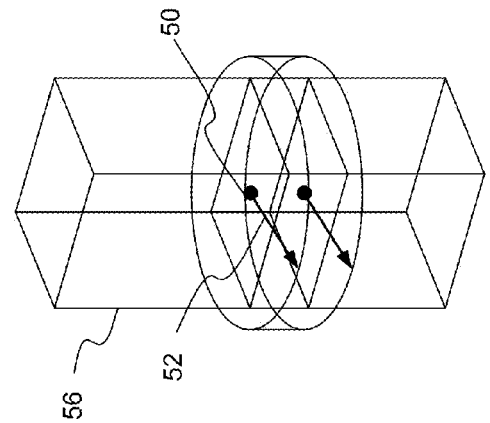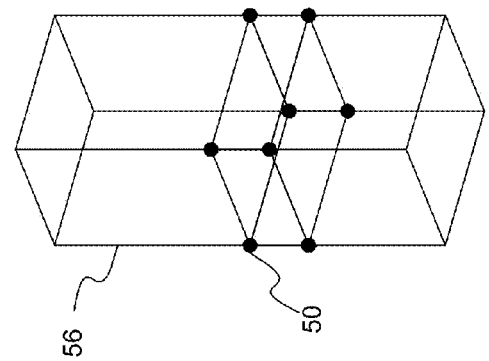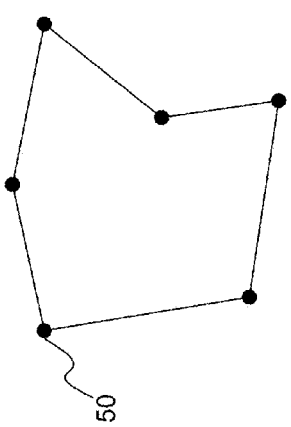
FIGURE 4

GEOCAST-BASED SITUATION AWARENESS

TECHNICAL FIELD

The technical field generally relates to situation awareness, and more specifically to field monitoring and providing situation awareness support via a geographic broadcast protocol.

BACKGROUND

Field operations in which a team of people performs a task under real world conditions are critical to many military, lifesaving, and emergency response activities. Field operations may include, for example, military operations such as reconnaissance, convoys, force protection, and hostage rescue, as well as non-military operations such as firefighting, police actions, and emergency relief. As difficulty, scale, and criticality increase, it becomes more essential that mistakes are avoided and tactics and strategies maximize efficient use of resources. Many factors may contribute to an increase in difficulty, scale, and/or criticality. For example, field operations scenarios may take place in geographic areas where no telecommunications infrastructure network coverage is present, either because a network was never installed, a network is not functioning properly, or a network is overloaded. For instance, military operations may take place in far flung desert, mountain, and jungle locales without infrastructure. Emergency responders may work in areas where a natural disaster has disabled or overloaded existing infrastructure. Further, network connectivity may be sporadic and dynamic.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

A field common operating picture (FCOP) may provide location tracking, movement history, telemetry, and messaging in near real time to all operators. A novel, scalable, distributed, technique for maintaining such a display using a scalable, may utilize an ad hoc geocast protocol as communication primitive.

In an example embodiment, information may be transferred using a query/response geocast message protocol. Caching on devices may be utilized to gain scalability. Query messages may be sent from a monitorer to a monitored region. In an example configuration, a query message may have a payload containing a type indication (e.g. query, response) and a header containing a description of a geocast region of intended reception, which may comprise the monitored region, the location of the monitorer, or any appropriate combination thereof. Response messages may be sent from devices located in the monitored region to an area containing the location of the sender of a query. In an example configuration, a response message may contain monitored information, such as current location, telemetry data, and/or recent movement history, or the like.

A device may monitor one or more regions. The monitoring device may geocast a query message to geocast region. The device may repeatedly geocast the query message. When a device receives a query message, the receiving device may clear its cache of information that stored therein within a previous predetermined time period. Upon clearing the cache in this manner, if no information remains in the cache that was previously sent to a geocast region that includes sender of the query message, the receiving device may compose a response message containing, for example, the receiving device's current position, movement history, and sensed telemetry data. The receiving device, then may geocast the composed response message to a target geographic region. The receiving device may record the composed response message and the time at which the response message was geocast. In an example embodiment, if the location of the sender of the query message is within the geocast region of the query message, the target geographic region may be geocast region of the query, otherwise the geographic region may be a region centered on the location of the sender of the query message.

BRIEF DESCRIPTION OF THE DRAWINGS

Reference is made here to the accompanying drawings, which are not necessarily drawn to scale.

FIG. 4, comprising FIG. 4A. FIG. 4B, FIG. 4C, FIG. 4D, and FIG. 4E, depict example geocast regions or boundaries.

DETAILED DESCRIPTION OF ILLUSTRATIVE EMBODIMENTS

Figure 1:
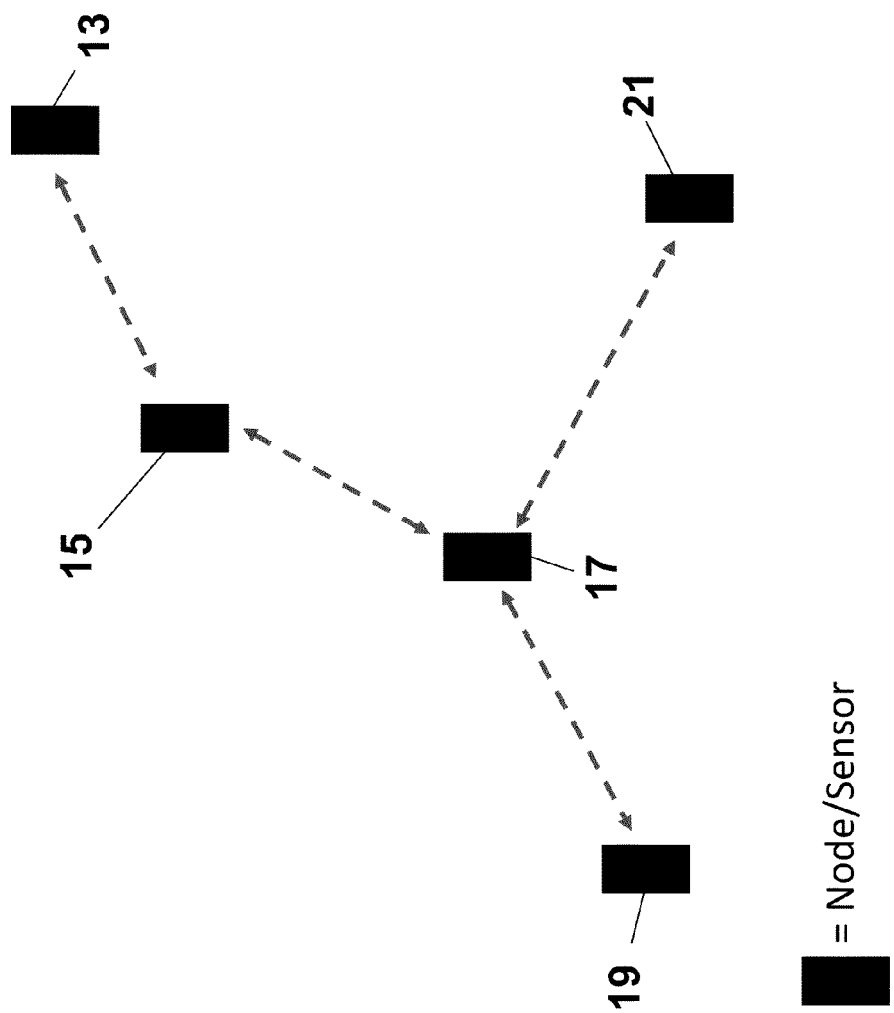
FIG. 1 illustrates an example mobile ad hoc network in which geocast-based situation awareness may be implemented.

Aspects of the instant disclosure are described more fully herein with reference to the accompanying drawings, in which example embodiments are shown. In the following description, for purposes of explanation, numerous specific details are set forth in order to provide a understanding of the various embodiments. However, the instant disclosure may be embodied in many different forms and should not be construed as limited to the example embodiments set forth herein. Like numbers refer to like elements throughout.

Various embodiments of geocast-based situation awareness, and implementation mechanisms for geocast-based situation awareness are described herein. The described embodiments are merely examples that may be embodied in various and alternative forms, and combinations thereof. As used herein, for example, "exemplary," and similar terms, refer expansively to embodiments that serve as an illustration, specimen, model, or pattern, and should not be construed to mean preferred or advantageous over other aspects or designs, nor is it mean to preclude equivalent exemplary structures and techniques known to those of ordinary skill in the art. The figures are not necessarily to scale and some features may be exaggerated or minimized, such as to show details of particular components. In some instances, well-known components, systems, materials, or methods have not been described in detail in order to avoid obscuring the instant disclosure. Therefore, specific structural and functional details disclosed herein are not to be interpreted as limiting, but rather as a basis for the claims and as a representative basis for teaching one skilled in the art how to employ the teachings instant application in various ways.

While the description includes a general context of computer-executable instructions, geocast-based situation awareness also may be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, or the like.

In an example embodiment, geocast-based situation awareness can be implemented via a scalable, wireless, geographic multicast ("geocast") protocol. Geocast-based situation awareness via a geocast protocol can provide a field common operating picture to personnel via mobile communication devices, such as wireless terminals (WTs) without relying on traditional network elements. Geocast-based situation awareness may be implemented over an ad hoc network of mobile communications devices, eliminating the need for traditional mobile communications infrastructure and central servers. Because no network infrastructure is required, geocast-based situation awareness may be implemented in remote areas with little or no network access. The scalable nature of the geocast protocol can enable implementation of geocast-based situation awareness equally well in both remote areas and crowded areas containing members of a field operations team and other users of mobile communications devices. Geocast-based situation awareness also may be implemented using tiered geocasting which can provide a field common operating picture that spans great distances. For example, a filed common operating picture spanning separate continents may be provided.

WTs taking part in geocast-based situation awareness may be programmed with a geocast-based situation awareness application, which uses geolocation information obtained from a locating system, such as, for example, a global positioning system (GPS), or the like.

The geocast-based situation awareness application of each WT may use movement data from an inertial unit, or the like, of the WT to track a posture and/or movement of a team member, to render (e.g., display) a field common operating picture.

The scalable tiered geocast communication protocol can be programmed into each WT taking part in geocast-based situation awareness, and any WT that operates to relay communications to or from the WTs taking part in geocast-based situation awareness. The WTs taking part in geocast-based situation awareness may share changed situation conditions, such as WT geolocation, between them via geocast data packets transmitted over one or both of a first tier, short-range, network, and a second tier, long-range, network according to transmission heuristics of the tiered geocast protocol.

In an example embodiment, each WT taking part in geocast-based situation awareness can be programmed with the scalable tiered geocast communication protocol. One example of a type of scalable protocol is the mobile ad hoc network geocast protocol. Using the tiered geocast protocol, geocast-based situation awareness may be occasioned in all types of network scenarios, including those in which relevant areas are densely populated with participating WTs, those in which areas are sparsely populated, and even in areas long-range infrastructure such as cell towers, Wi-Fi hotspot or other internet router are not reachable by the WTs.

Geocast protocols differ from a traditional Internet protocol (IP) such as the uniform datagram protocol (UDP) in that messages are addressed to a destination geocast region instead of an IP address, such as an UDP address. Utilizing the geocast protocol, WTs in a target area do not need to register to a group address, as required of some other protocols. In some example embodiments, each geocast data packet can be assigned, at origination, a globally unique packet serial number. The unique packet serial number can be read by participating devices according to the protocol to, for example, determine whether a particular data packet is being received for a first time or has been received before. The packet serial number and all other packet information may be positioned in a header or body of the data packet.

The geocast-based situation awareness application may be, in some embodiments, configured to store pre-set or previously identified geocast destination, locations, boundary, region, or the like.

Geocast data packets can be transmitted according to heuristics of a tiered geocast protocol, which is described in more detail herein, to a destination geocast region for reception by all devices located in the region that are programmed with the geocast protocol, i.e., participating devices.

Although basic geocasting over only a single network (e.g., long-range network) can enable communications in some situations where traditional networking is impractical or inadequate, it may be that, in some embodiments, one may selectively geocast over one or more of two or more networks (i.e., tiers) versus the flat configuration of a single network. The tiered geocast protocol of the present disclosure improves on single-network geocasting by providing the heuristics, or decision rules, for selectively propagating geocast data packets within a relatively short-range, peer-to-peer network, and bridging packets onto a long-range network for long-distance transport depending on various circumstances. Each participating WT and other nodes (e.g., Wi-Fi access point or other router) can have forwarding rules, including geographical parameters, and a look-up table for use in implementing the rules.

In an example embodiment, the geocast system can be configured such that a transmitting WT receives a confirmation that a geocast data packet was transmitted successfully. For example, it is contemplated that at least one of the WTs in a geocasting destination region, even if not a WT actively participating, could return geocast a confirmation data packet indicating that the packet was received by a WT in the region. In one contemplated embodiment, although the protocol is based on a geographical address and not a device-specific address, a device-specific address of a target WT participating is included in a geocast and the target WT initiates inclusion in a return geocast data packet of a confirmation of receipt message to the originating WT.

In addition, in some embodiments, a geocast data packet can include one or more fields, such as in a header or body of the packet, in which information related to a path taken by a packet is recorded. For example, a receiving node (e.g., WT or Internet router) receiving a geocast can retrieve data from the geocast header to identify an ordered list of the nodes whose transmissions led to the receiving node receiving it. In this way, path discovery may be integrated into the transmission process. Any node can also use this information to send a source-routed unicast back to any node along the path, which is termed reverse-path forwarding (RPF).

Although a two-tiered communication system, including a first short-range peer-to-peer network and a long-range network, is described herein, the geocast-based situation awareness application of the present disclosure may be implemented in connection with a protocol and communication system using other types of networks as well as or instead of those described herein, and in connection with more than two network tiers.

Propagations over the short-range network can be made between devices programmed with the scalable tiered geocast protocol, whereby adjacent devices are within range of each other, such as radio range (e.g., 100 meters). The WTs and tiered geocast protocol can be configured to transmit geocast data packets over one or more short-range networks, including existing wireless local area networks (WLANs), such an IEEE 802.11 network. As an example, when a first WT is about 900 meters from an edge of a geocasting region including a second WT, a geocast data packet from the first device could be broadcasted and participating intermediate devices could receive and retransmit the geocast data packet until it reached the geocast region, without need for transmission over an Internet router or other base station. In this example, depending on the location of a retransmitting device, the geocast data packet can be broadcast to the geocast region in one or two hops.

Geocast-based situation awareness may be particularly suited to highly mobile devices without requiring connection to an infrastructure-based communications network. A mobile ad hoc network is an example of such a set of devices. Mobile ad hoc networks can extend the reach of data networking into areas and scenarios in which infrastructure-based networking is impossible or impractical. For example, mobile ad hoc networks can allow first responders to use networked messaging and information applications in a zone where the network infrastructure has been destroyed by a disaster. Mobile ad hoc networks can provide military units operating in battlefield situations lacking infrastructure the same types of benefits as infrastructure-based networks. Mobile ad hoc networks can allow networking among low resource nodes, such as man-worn devices powered by lightweight wearable batteries, by allowing units to relay each other's short-range transmissions, instead of each unit transmitting long range directly to the destination.

To better understand geocast-based situation awareness and applications thereof, a description of mobile ad hoc networks is provided. In is to be understood however, that applications of geocast-based situation awareness are not limited to mobile ad hoc networks. Rather, geocast-based situation awareness is applicable to any appropriate device or group of devices.

A mobile ad hoc network can comprises communications devices (also referred to as nodes) that communicate with each other via geographical broadcasting, referred to as geocasting. Geocasting is described in U.S. Pat. No. 7,525,933, entitled "System And Method For Mobile Ad Hoc Network," filed Nov. 30, 2005, issued Apr. 28, 2009, and is incorporated by reference herein in its entirety. Geocasting can use a protocol in which an IP address is replaced with a geographic address. Thus, each geocast message can comprise an indication of a location of a geographic region of intended reception of the geocast message. Generally, a packet may be sent to every communications device located within a specific geographic region. The packet can contain an indication of the location of the sender, an indication of the geographic region, a payload, or a combination thereof, or the like. The communications devices in the geographic region, and any other communications devices that can communicate with them, are referred to, collectively, as a mobile ad hoc network. No registration need be required to become a member of the mobile ad hoc network. Any communications device in the mobile ad hoc network can send a message to any or every communications device in the mobile ad hoc network. As communications devices move within communications range of any member of the mobile ad hoc network, they can become members of the mobile ad hoc network without requiring registration. The communications devices of the ad hoc network of communications devices may communicate with each other. The ad hoc network of communications devices does not require base station terminals to control communications between the mobile devices. In example embodiments, base stations or routers may be used to relay messages between different mobile ad hoc networks, or to use other network transports such as other traditional internet protocol networks, such as the internet, to bridge messages between mobile ad hoc networks. Each communications device may be capable of receiving and/or transmitting data packets to and/or from other communications devices in the mobile ad hoc network.

In an example embodiment, a communications device can transfer packets to other communications devices according to heuristic decision rules that determine whether a receiving device will re-transmit a received packet. These rules can effectively guide packets to their destinations and control communication traffic within the ad hoc network. The decision rules can achieve this control by using statistics obtained and recorded by a communications device as it receives packets transmitted within reception range within its environment. This distributed packet transfer mechanism cab result in packets "flowing" to and throughout the geocast region specified in each packet. The communications devices in the geocast region can receive and process each distinct packet, typically rendering the content to the user via a user interface of a communications device. Two packets may be distinct if they contain distinct geocast identifiers. However, a re-transmitted copy of a packet generally will contain the same geocast identifier as the original packet.

FIG. 1 illustrates an example mobile ad hoc network in which a mobile device configured to facilitate geocast-based situation awareness via an ad hoc geographic routing/broadcast (geocast) protocol may be implemented. Communications devices, also referred to herein as devices, mobile devices, or nodes, in the mobile ad hoc network can communicate via RF encoded with geographic information, via Bluetooth technology, via Wi-Fi (e.g., in accordance with the 802.11 standard), or the like, or any combination thereof. For example, as depicted in FIG. 1, communication devices 13, 15, 17, 19, and 21 can form a mobile ad hoc network. As shown in FIG. 1, communication device 13 can communicate with communications device 15 directly (e.g., via Bluetooth). Communication device 15 can communicate with communications device 17, and thus can retransmit information received from communications device 13 to communications device 17, and vice versa (retransmit information received from communications device 17 to communications device 13). Communications device 17 can communicate with communications devices 19 and 21, and can relay information from/to communications devices 19 and/or 21 to/from communications devices 13 and/or 15.

Although not depicted in FIG. 1, it is possible, in a mobile ad hoc network, that, for a pair of nodes (A and B for example), node A can receive from node B but node B cannot receive from node A. In an example embodiment, this asymmetric style of communication may be potentially likely in a mobile ad hoc network.

In an example embodiment, communications devices that receive a message, such as a query or a response, can resend the query/response in accordance with the scalable wireless geocast protocol. For example, a communication device's ability to retransmit a query/response can be based on the number of times the query/response was previously received, the communication device's proximity with respect to the communications devices from which the query/response was sent, and/or the communication device's proximity to the geocast region. This can be implemented as a three step location-based approach, which is described in detail in the aforementioned U.S. Pat. No. 7,525,933, entitled "System And Method For Mobile Ad Hoc Network," filed Nov. 30, 2005, issued Apr. 28, 2009. First, in accordance with the location-based approach, the receiving communication device determines whether it has previously received the same query/response at least a predetermined number (N) of times. If not, it retransmits the query/response over the ad hoc network of communications devices. If so, the communications device progresses to the second step and determines whether the sending communications device is closer than some minimum distance away. If no prior transmitter of the query/response was closer than some minimum distance away, the communications device retransmits the query/response over the ad hoc network of communications devices. Otherwise, the communications device progresses to the third step and determines whether it is closer to the center of the geocast region than any sending communications device from which the query/response was received. If so, the communications device transmits the query/response over the ad hoc network of communications devices. If not, the communications device does not retransmit the query/response.

This location-based approach prevents the receiving communications device from retransmitting a message that was most likely already retransmitted by another communications device located close to it (and thus most likely reaching the same neighboring communications devices that it can reach). In addition, this location-based approach reduces the chance that the communications device will retransmit the same message multiple times to the same neighboring communications devices.

As mentioned above, a mobile ad hoc network does not require a communications network infrastructure or a Wi-Fi access point. However, in an example configuration, a mobile ad hoc network can utilize Wi-Fi access points and/or a communications network infrastructure.

Figure 2:
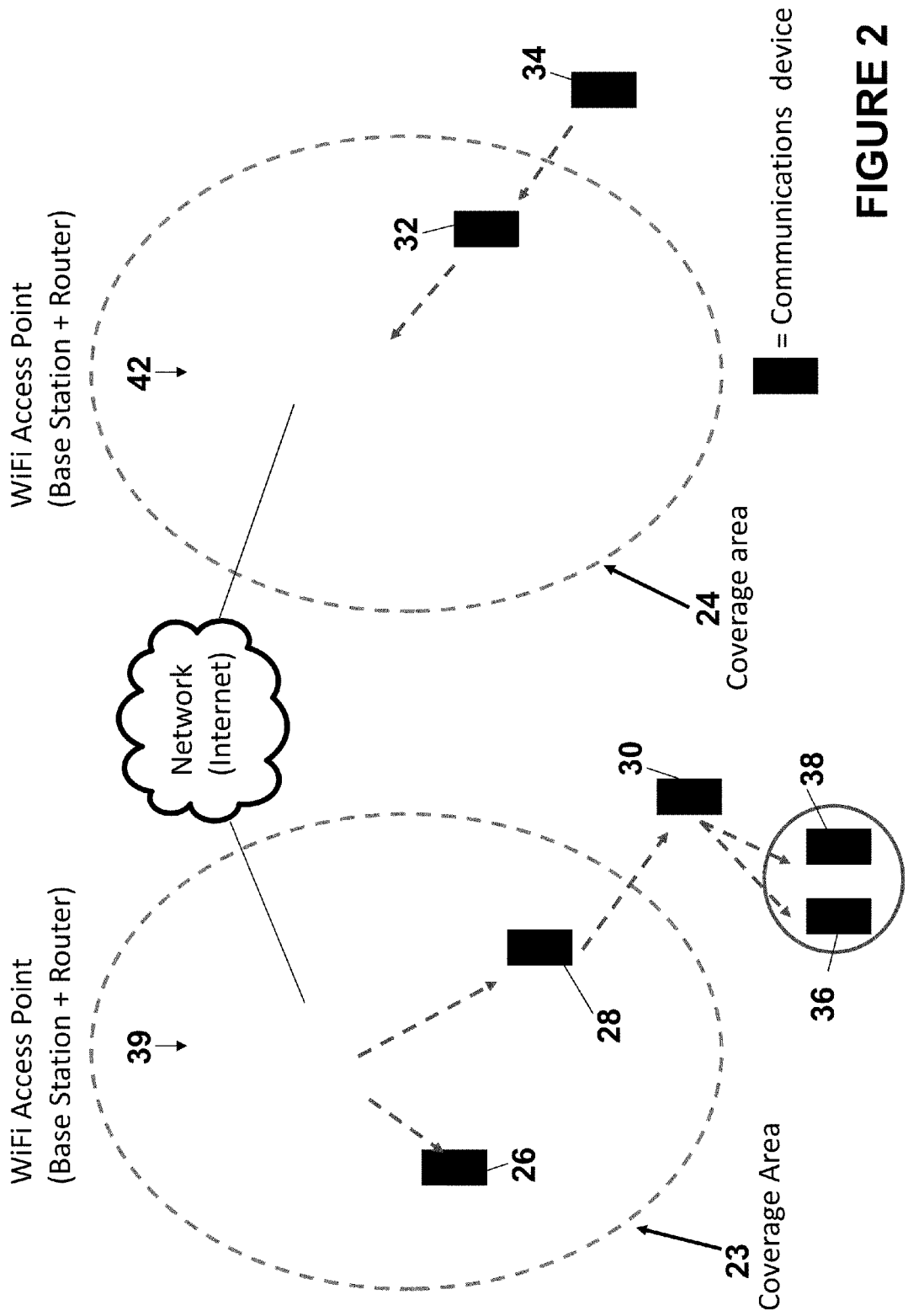
FIG. 2 illustrates example communications in an ad hoc network in which geocast-based situation awareness may be implemented via a Wi-Fi access point.

FIG. 2 illustrates an example ad hoc network utilizing a Wi-Fi access point. As depicted in FIG. 2, communication devices 26, 28, 30, 36, and 38 form a mobile ad hoc network and communication device 32 and 34 form another mobile ad hoc network. Coverage area 23, which is the area covered by a Wi-Fi access point 39, covers communication devices 26 and 28. Coverage area 24, which is the area covered by another WiFi access point 42 covers communication device 32. As shown in FIG. 2, communication device 34 transmits to communication device 32 directly (e.g., via Bluetooth). Communication device 32 retransmits to a WiFi access point 42 which in turn may retransmit to the other WiFi access point 39 via a network such as the Internet, for example. Communication devices 26 and 28 receive the transmission from the WiFi access point 39, and communication device 28 retransmits directly to communication device 30. And, as depicted, communication device 30 retransmits to other communication devices 36 and 38.

Figure 3:
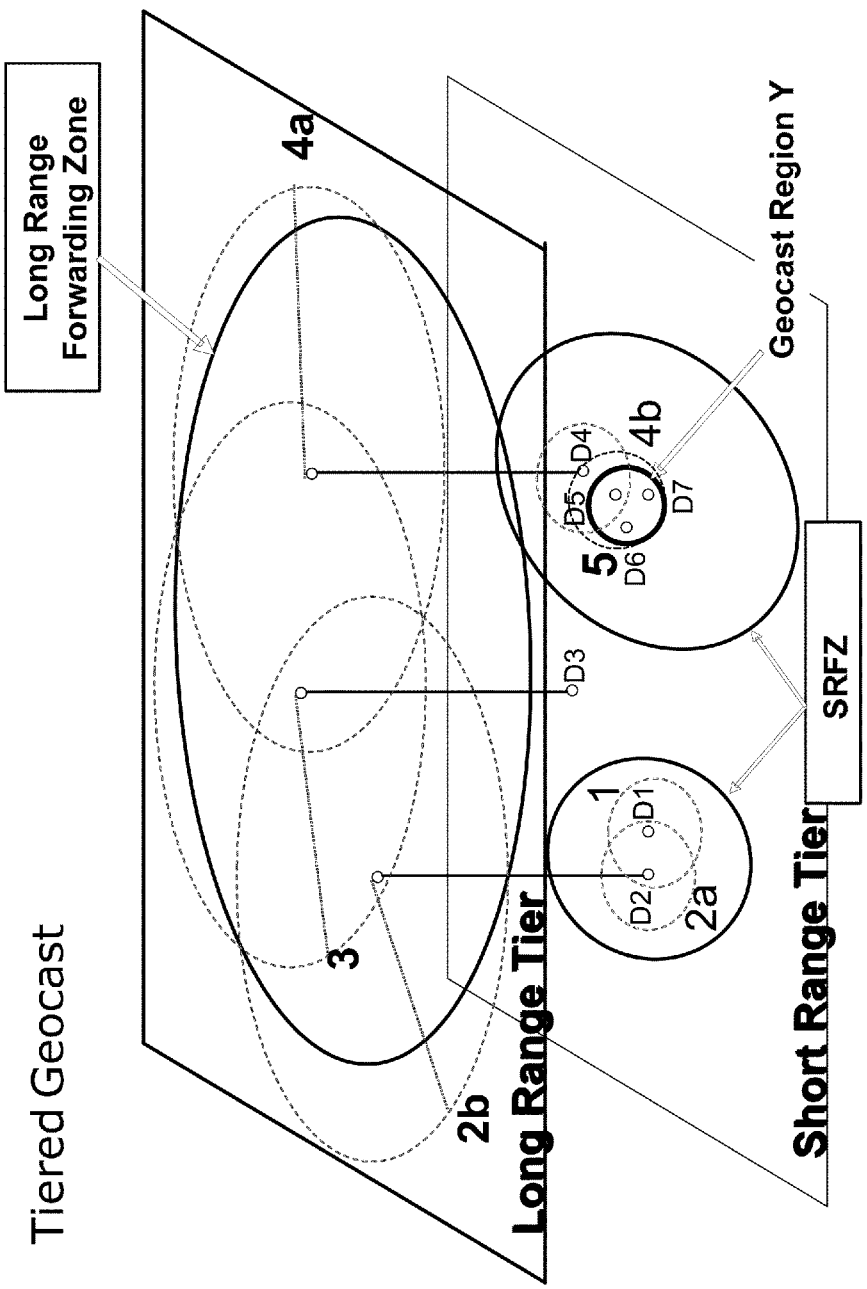
FIG. 3 illustrates an example mobile ad hoc network in which geocast-based situation awareness may be implemented utilizing tiered geocasting and forwarding zones.

FIG. 3 illustrates an example mobile ad hoc network in which geocast-based situation awareness via an ad hoc geographic routing/broadcast (geocast) protocol may be implemented utilizing tiered geocasting and forwarding zones. Tiered geocasting uses long range (LR) transmitters (such as communications devices, etc.), infrastructure, a communications network, a cellular tower, or a combination thereof, when available. Tiered geocasting assumes that at least one tier is usable by at least one of the communications devices. A long range tier is a tier wherein characteristic message transfers between devices occur over a longer physical range than those over some other tier. A long range tier can be wireless, wired, or a combination thereof.

A forwarding zone can be utilized to implement tiered geocasting. A common forwarding zone can be defined for all geocast packets or different forwarding zones can be defined for each type of geocast packet. Forwarding zones (as shown in FIG. 3, for example and without limitation) can be defined differently in different tiers, even for the same packet type or even same packet. Thus, forwarding heuristics can be applied independently per tier, with bridging at multi-tier capable nodes. In an example embodiment, a communications device retransmits a packet only if the communications device is located within the forwarding zone defined for the packet's type. This determination is in addition to the determinations described above and, if the communications device is not in the forwarding zone, the packet will not be retransmitted, even if one or more of the above conditions would otherwise have caused a retransmission hold.

As depicted in FIG. 3, nodes (e.g., communications devices) D1, D2, D3, D4, D5, D6, and D7, are at various locations within short range (SR) and long range (LR) tiers. All of devices D1, D2, D3, D4, D5, D6, and D7 together form a mobile ad hoc network, with devices D5, D6, and D7 being located in geocast region Y, hence being targets of a message sent by D1. Each communications device D1, D2, D3, D4, D5, D6, and D7 can determine its own geographical location through any type of location determination system including, for example, the Global Positioning System (GPS), assisted GPS (A-GPS), time difference of arrival calculations, configured constant location (in the case of non-moving nodes), any combination thereof, or any other appropriate means. Each communications device is operable to transmit and receive packets on a mobile ad hoc network. In addition, at any given time, some subset (possibly all) of the communications devices may be operable to transmit and receive packets over the long range tier network. For example, though not a limitation, in FIG. 3, devices D2, D3, and D4 can transmit and receive messages over both the short and long range tiers. Note that this latter fact is indicated visually in the diagram by D2, D3, and D4 each having two dots (one in the short range tier and one in the long range tier) connected by a vertical line. The long-rang tier network can be any network in which packets can be transmitted from one long range capable communications device to another long range capable communications device. Such packet networks can include, for example, an infrastructure-based network comprising wireless base stations (for up- and down-link) operating on a separate frequency from that used by an ad hoc network. In addition, the long rang tier network also could be implemented simply as another instance of an ad hoc network using distinct radio frequencies and possibly longer radio ranges.

Communications device D1 transmits the message, and communications device D2 receives the transmission from communications device D1. Communications device D2 retransmits (transmission 2a), within the short range tier and in accordance with the heuristics for the short range forwarding zone (SRFZ) as well as within the long range tier (transmission 2b). Communications D2, with long range transmission capability (in the long range tier) retransmits in the long range tier as well (transmission 2b). Communications device D3 receives the transmission 2b from communications device D2 and retransmits (as transmission 3) in the long range tier only. Communications device D4 receives the transmission 3 from communications device D3 and retransmits both on the long and short range tiers, resulting in transmission 4a in the long range tier and 4b in the short range tier. Communications device D5, within geocast region Y, receives the transmission 4a, and in turn retransmits (transmission 5) within the geocast region Y. Transmission 5 is received by the other devices in geocast region Y, namely devices D6 and D7, thus completing the geocast message transfer.

Geocast origination, destination, and termination regions can be defined by geographic parameters and may have any size and shape. As examples, the regions may be defined by three or more bounding geographic coordinates, forming a triangle, rectangle, or other shape, or a single geographic coordinate and a radius or diameter, forming a geocast region.

FIG. 4, comprising FIG. 4A, FIG. 4B, FIG. 4C, FIG. 4D, and FIG. 4E depicts example geocast regions or boundaries which can be utilized to facilitate geocast-based situation awareness via a geocast protocol. A geocast region may be defined to be a single point 50, as depicted in FIG. 4A. A point geocast region may be defined by a longitude value and a latitude value (not shown). A point above the surface of the earth could be defined by providing an altitude value in addition to longitude and latitude values. A geocast region may also comprise multiple single points (not shown) such as the single point 50. Location points such as point 50 may be used as the building blocks for more complex geocast region geometries, as described herein. FIG. 4B depicts a geocast region defined by a point 50 in combination with a radius 52. The geocast region of this example may comprise the area enclosed by the radius, and may include the space above the area as well. A geocast region could also be defined as the overlap region between two or more circular geocast regions (not shown). FIG. 4C depicts a more complex geometry formed from a series of points 50 interconnected with straight boundary lines. This technique of geocast region definition is similar to the techniques typically used in the definition of parcels of real property. FIGS. 4D and 4E depict the creation of one or more geocast regions within a single geographic footprint. FIG. 4D depicts creating a geocast region for a specific floor of a building 56. The single floor geocast region is defined as the volume of space between upper and lower areas, each formed using a series of points 50 set at corners of the buildings. FIG. 4E depicts an alternate technique for defining a single floor geocast region in building 56. Upper and lower points 50 are defined in the middle of the ceiling and the floor of the geocast region respectively. The single floor geocast region is then defined as the volume of space between an upper area and a lower area defined by a pair of radii 52 extending from the middle points. Geocast regions may also be defined to change in size, geographic location, etc. with time (not shown), essentially allowing the creation of geocast regions in four dimensions. For example a region may be defined to change size, shape, and/or geographic location over time as the number of participating nodes fluctuates. Information defining a particular geocast region (e.g., a series of points) can be communicated in an addressing portion of a geocast message. Geocast sub-regions may be defined within a particular geocast region using the above techniques. It should be noted that the techniques described with reference to FIGS. 4A-4E are merely examples, and the scope of the instant disclosure should not be limited thereto. Other region geometries and techniques for defining regions may be recognized by those skilled in the art, and are meant to be included within the scope of the instant disclosure.

In some embodiments, a geocast region can be selected by making one or more selections on a map and/or from a list. A region can be selected from a list displayed on a mobile communications device, or the like. The list can comprise real world locations. For example, one can scroll through a list by touching the display surface of a mobile communications device, or the like, by providing a voice command (e.g., "Scroll List"), by entering text on which to search, by moving the device, or any appropriate combination thereof. In another example embodiment, the selection of a region, or the like can be made by selecting a location on the map by a finger, fingers, and/or any other appropriate device, and, for example, dragging away or gesture-pinching, from the selected location to create the size of the a circle, oval, rectangular, square, polygon, or any appropriate shape (two dimensional or three dimensional) representing a destination, termination, boundary, region, or the like. In various example embodiments, locations, such as addresses, and/or region dimensions, building names, institution names, landmarks, etc. may be input in other ways by a player, such as by typing, gesture, and/or voice input. Indeed, many variations of textual, graphical, and audio inputs, either alone or in combination, may be utilized for selecting a geocast region in accordance with example embodiments of the present disclosure.

As described herein, field operations teams may benefit from situational awareness support in order to efficiently carry out high risk safety critical tasks. A field common operating picture (FCOP), as described herein, may provide location tracking, movement history, telemetry, and messaging, or the like, in near real time to all operators equally. Geocast-based situation awareness, as described herein, may utilize a scalable distributed technique for maintaining a FCOP using a scalable ad hoc geocast protocol as a communication primitive.

To support situation awareness, it may be advantageous for all team members (not just commanders) to keep aware of a situation in real time. Such a common operating picture (COP) may include the abilities to track location, movement history, and telemetry of other operators, as well as sending and receiving geographically addressed messages. For example, fire fighters may use this capability to coordinate their actions, monitor each other's health, and warn of impending hazards. Military teams may use this capability to maintain relative positions, track search and other spatial operations, monitor health, and avoid hazardous weapons fire areas. Geographic addressing of messages may allow sending a message to all devices in an area, even when the sender does not know in advance who, if anyone, is there.

Figure 5:
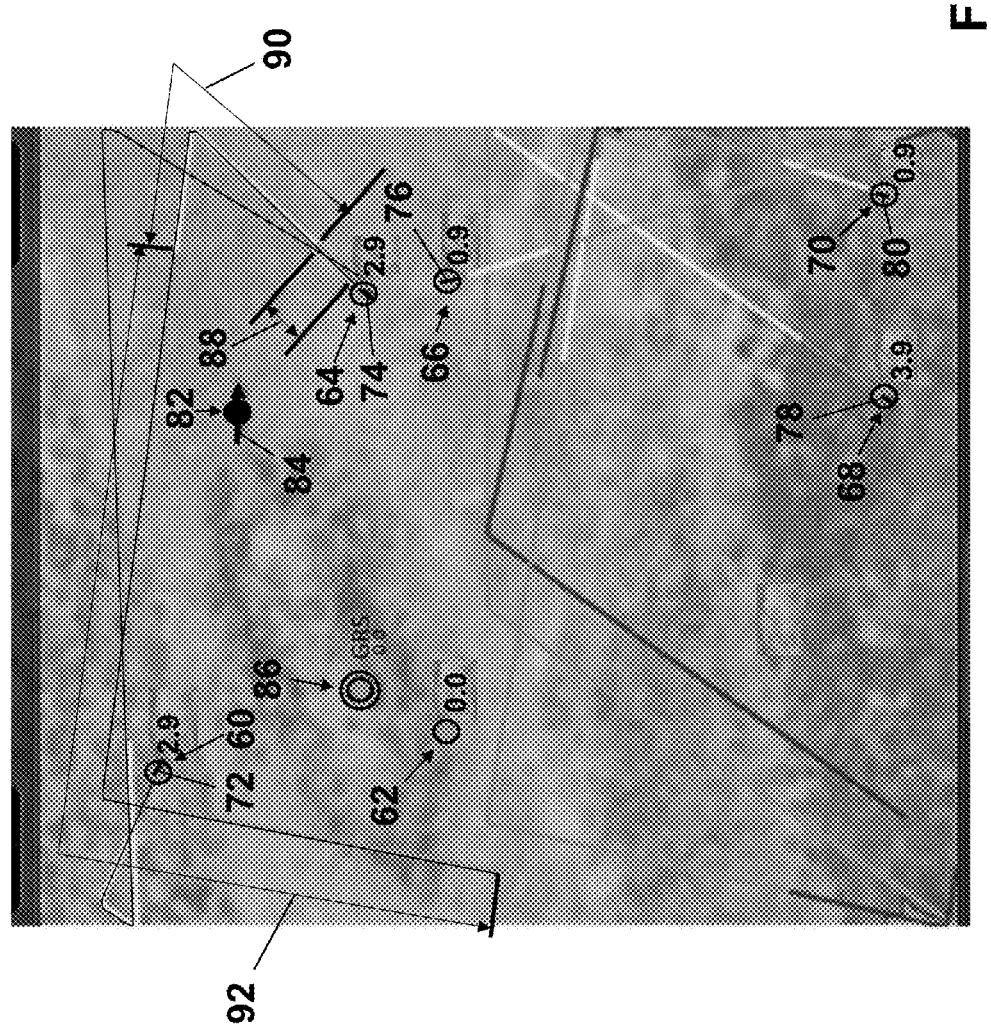
FIG. 5 illustrates an example field common operating picture.

FIG. 5 illustrates an example field common operating picture as may be rendered on a display. Positions of operators may be indicated in an appropriate manner. For example, positions of operators may be indicated as dots, circles, polygons, or any appropriate shape and/or icon, or any appropriate combination thereof. As illustrated in FIG. 5, in an example embodiment, positions of operators may be indicated as dots, or circles (60, 62, 64, 66, 68, 70). Telemetry may be demonstrated by a vector velocity, indicated as a bar, or line, pointing in, or along, the direction of movement (72, 74, 76, 78, 80). In an example embodiment, a length of a velocity vector bar, or the like, as rendered on a display may be a relative indication of a speed. For example, a longer bar may be indicative of a greater speed (faster) than a shorter bar. As depicted in FIG. 5, operator 60 has associated therewith vector velocity bar 72, operator 62 is stationary and has no vector velocity bar associated therewith, operator 64 has associated therewith vector velocity bar 74, operator 70 has associated therewith vector velocity bar 80, and operator 68 has associated therewith vector velocity bar 78. Linear speed may be depicted as a number rendered proximate an illustrated position of an operator. For example, as shown in FIG. 5, operator 60 is moving at 2.9 miles per hour (mph), operator 62 is stationary as indicated by the number 0.0, operator 64 is moving at 2.9 mph, operator 66 is moving at 0.9 mph, operator 70 is moving at 0.9 mph, and operator 68 is moving at 3.9 mph. In various example embodiments, any appropriate character, icon, symbol, letter, number, or the like, or any appropriate combination thereof, may be rendered proximate an indication of an operator to identify the operator. The solid dot 82 may represent position/location of the device hosting the display, with the arrow 84 representing a compass heading of the device. Note, the top of the display of FIG. 5 could be true North, for example.

In various example embodiments, collected information may be suppressed from the common operating picture display, and be available via an action, such as, for example, a tap on an icon or the like (e.g., dot) representing a device. For example, telemetry information and/or other detailed information may be observed by tapping a dot or accessing a menu associated with a specific device.

Incoming messages may be indicated on the display. For example, as shown in FIG. 5, the concentric circles 86 indicate that a message has been received from an operator "GRS". Tails may be depicted to provide an indication of movement history.

For example, movement history may be represented by tail segments that may be emphasized (e.g., color coded, highlighted, patterned, fonted, or the like) to indicate recency of the information. A first tail segment closest to a rendered display of an operator may be emphasized to indicate most recent information. A next tail segment, connected to the first tail segment and further away from the rendered display of the operator may be emphasized to indicate less recent information, and successive tail segments may be emphasized to indicate successively less recent information. As an illustrative example, referring to operator 64, a first tail segment 88 may be emphasized (e.g., color coded green) to indicate most recent time (e.g., past 15 seconds). The next tail segment 90 may be emphasized (e.g., color coded yellow) to indicate less recent time (e.g., past 15-60 seconds). The next tail segment 92 may be emphasized (e.g., color coded orange) to indicate even less recent time (e.g., past 60-240 seconds). Additionally, longer tails could be displayed and emphasized, such as, for example, a red color coded tail segment could indicate a the past 240 to 960 seconds. It is to be under stood that any appropriate emphasis may be used. For example, tail segments could be rendered as patterned lines (e.g., solid line, dashed line, double line, etc.) to represent different time segments, tail segments could blink or flash at various rates to indicate various time segments, tail segments could be rendered as lines of various thickness to indicate various time segments, or the like, or any appropriate combination thereof. In an example embodiment, rendering of movement history information may be filtered by time as specific by a user of a device. For example a user may designate that history information only as recent as time X be rendered/displayed.

Figure 6:
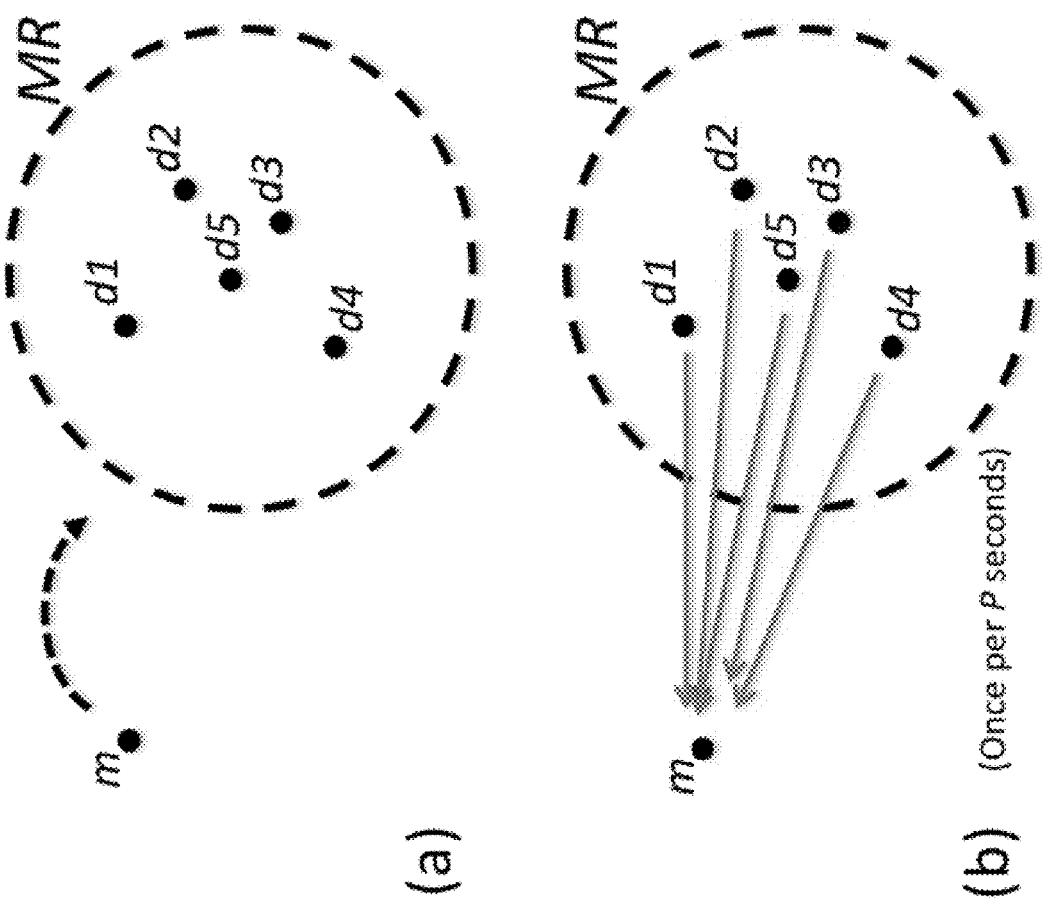
FIG. 6 is an illustration of example field monitoring scenarios (a) and (b).

FIG. 6 is an illustration of example field monitoring scenarios (a) and (b). As shown in FIG. 6, scenario (a) involves providing awareness information about each monitored device (d1, d2, d3, d4, d5) in a specified area, referred to herein as the monitored region (MR), to a monitoring device, m. In an example embodiment, awareness information comprises an indication of the age of the information in order for a monitorer (e.g., recipient of the awareness information) to be able to determine how current the awareness information is. Additionally, as depicted in scenario (b) of FIG. 6, the system may be capable of reporting one round of awareness information, e.g., one report from each monitored device (d1, d2, d3, d4, d5), to the monitoring device, m, during any interval of P seconds. P may be any appropriate period of time. P may be a predetermined period of time, P may be a time that is dynamically calculate and thus changeable, P may be based on a quality parameter, or the like, or any appropriate combination thereof.

Figure 7:
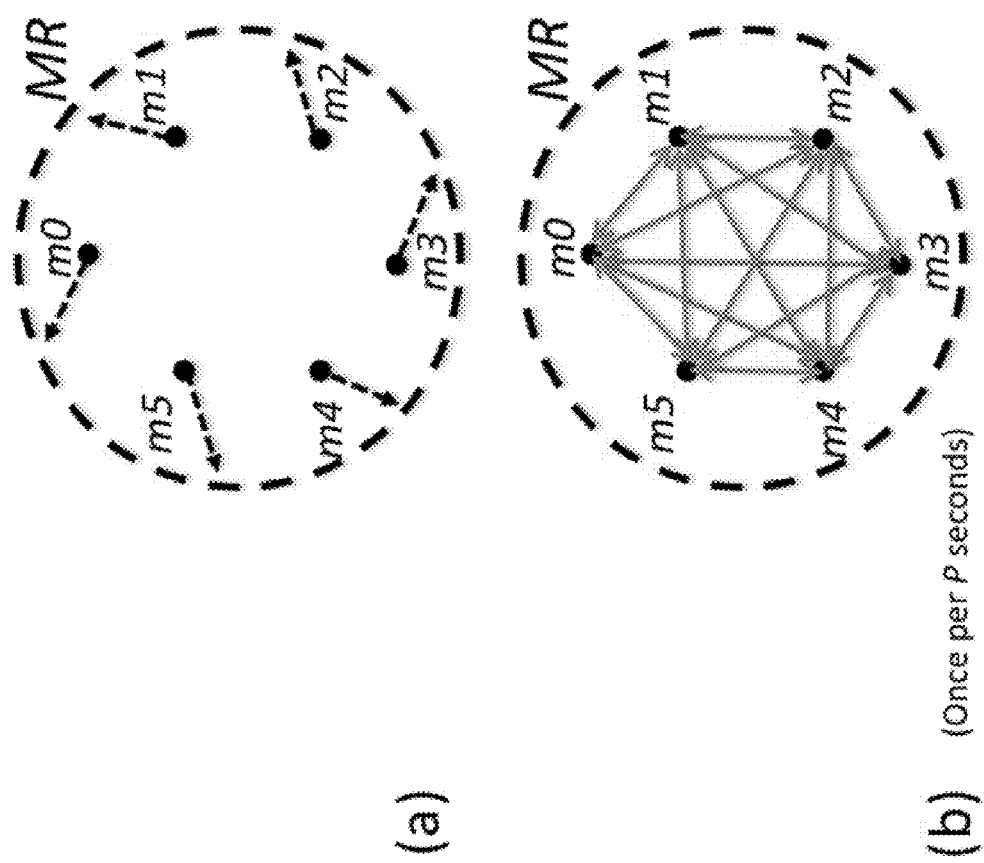
FIG. 7 illustrates example field common operating picture (FCOP) scenarios (a) and (b).

FIG. 7 illustrates example field common operating picture (FCOP) scenarios (a) and (b). As depicted in scenario (a) of FIG. 7, all devices (m0, m1, m2, m3, m4, m5) are located in the same area they are each monitoring; hence, they each have a common picture of the monitored information. As shown in scenario (b) of FIG. 7, because every device provides its updates to every other device, the number of logical information flows per round increases as the square of the number of devices. Thus, for n devices, the number of information flows would be n(n−1). Note that these are logical information flows, in that the information flows from endpoint to endpoint of the paths indicated; however, the flows need not be distinct and separate device-to-device data flows (transmissions), although this is not precluded. To illustrate, device m0 could broadcast information via a single broadcast, which could be received by each of devices m1, m2, m3, m4, and m5. This would constitute 5 logical flows. Alternatively, device m0 could transmit information to each of device m1, m2, m3, m4, and m5, via 5 separate transmissions. This also would constitute 5 logical flows.

In an example embodiment, awareness information may comprise current location, recent movement history, and sensed telemetry data. Current time and/or temporal recency may allow tracking on a map or image display for current-situation awareness. Recent movement history may support awareness of the temporal situation and how the current situation has evolved. This is may be applicable when a new device is turned on or begins monitoring an area. Since the device was not previously monitoring the area, it cannot have been maintaining the history itself. Similarly, if an operator has to replace a damaged or discharged device during the operation, it should not entail losing all record of the recent past. Sensed telemetry data, may comprise any sensor data that can be collected by the device, such as heart rate or temperature, our smartphone implementation currently provides only velocity (direction and speed). In an example embodiment, all this information may be present in each update round.

Figure 8:
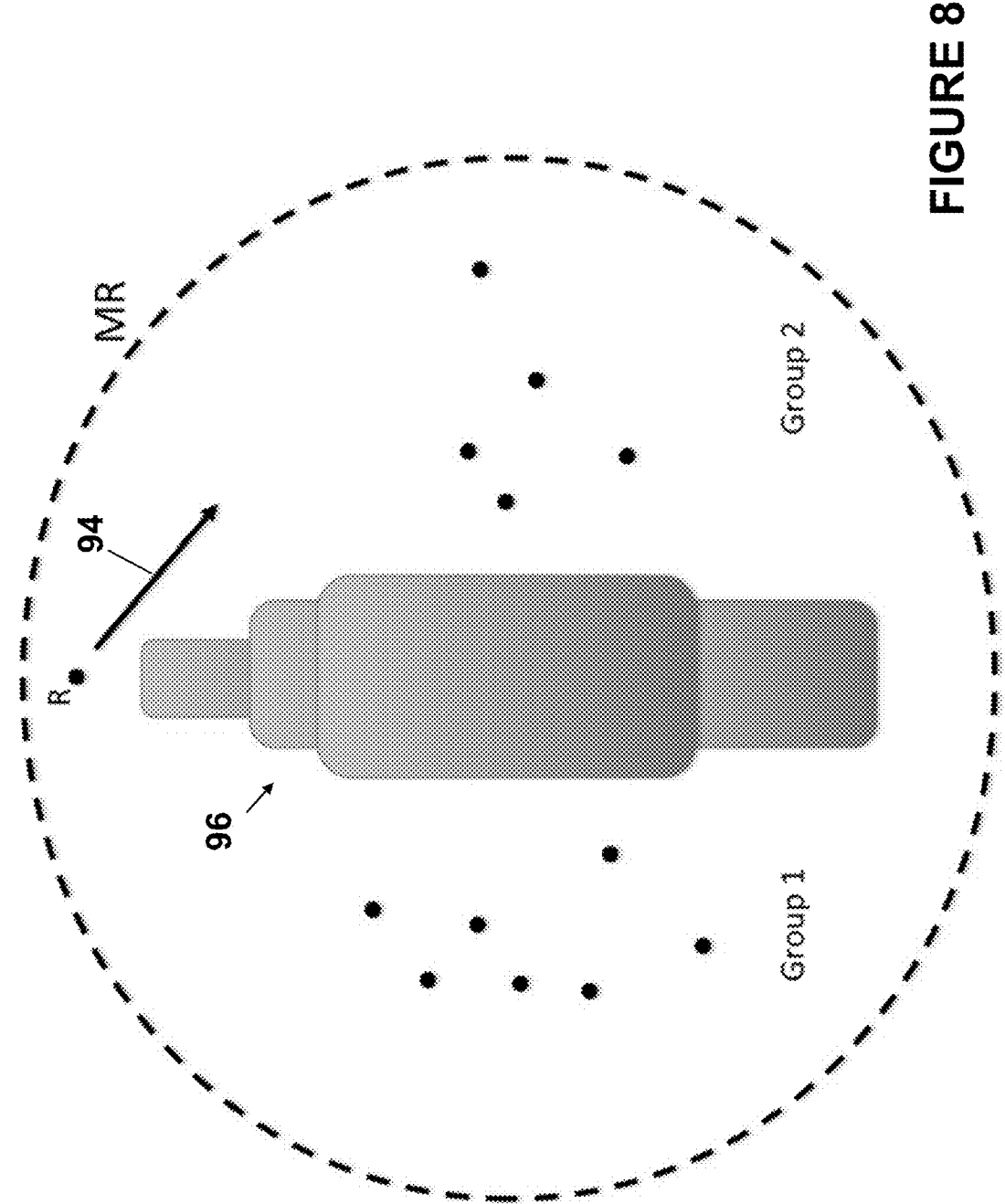
FIG. 8 depicts an example field operating condition wherein a network partition arises as a result of movement of a device, R.

FIG. 8 depicts an example field operating condition wherein a network partition arises as a result of movement of a device, R. Field operations scenarios may take place in geographic areas where no infrastructure network coverage is present, either because infrastructure was never built, infrastructure is broken, or infrastructure is overloaded. Military operations may take place in far flung desert, mountain, and jungle locales without infrastructure. Emergency responders may work in areas where a natural disaster has disabled existing infrastructure, or the disaster resulted in overloading networks. Accordingly, geocast-based information awareness support as described herein may be capable of working without such support. Further, geocast-based information awareness support as described herein, if network infrastructure is present, may be able to use it to support remote monitoring. For example, an incident commander may be able to remotely monitor an operation in an area far from a command post. Moreover, in the field, network connectivity maybe sporadic and dynamic. The set of network neighbors of a device can change often and without warning, as devices are carried behind obstacles or out of 1-hop range. The only communications devices in the area may be those carried by the operators themselves, and they may move around. Thus, geocast-based information awareness support as described herein may be able to deal with rapidly changing network topologies, and may be able to tolerate occasional and changing network partition conditions. For illustration, referring to FIG. 8, at first, the network is connected, and all devices (depicted as dots) successfully monitor each other. However, when device R moves as indicated by arrow 94, the central hills 96 create a network partition which prevents devices in Group 1 from monitoring Group 2 devices and vice versa. The herein described geocast-based information awareness support tolerates this by allowing Group 1 devices to continue monitoring all other Group 1 devices, while all Group 2 devices (which now includes R) can monitor all other Group 2 devices. Further, geocast-based information awareness support as described herein may scale efficiently as the number of devices to be monitored increases.

Geocast-based information awareness support may utilize geocast as a communication primitive. Geocast may be the addressing and delivery method of a network packet to all the devices in a specified physical area. That is, the area, referred to as the geocast region of the packet, may be specified as the address of the packet, and the network may deliver it. In an example embodiment, the geocast region may comprise a circle, specified by latitude and longitude coordinates of its center together with a radius in meters. There are many ways to implement geocast within a network. Georouting is an approach, which may be useful in wired networks, wherein one or more network servers keeps track of the geographic location of all devices and when one wishes to route to an area, one sends the geocast packet to the georouter, which then may use traditional IP routing to send to the devices known to be in the area. Simple flooding, on the other hand, does not depend upon a central server to know device locations; instead, each packet is broadcast by the originator and then retransmitted by all nodes of the network who hear it (or a copy of it). Each node calculates whether it is within the geocast region. In an example embodiment, geocast-based information awareness support as described herein may utilize an implementation of tiered geocast, with the wireless tier implemented according to the Scalable Ad hoc Geocast Protocol (SAGP), and the (optional) wired tier implemented using wide area data networking (e.g. commercial GSM) uplinks into the Internet and using georouting there. SAGP may operate over an 802.11 wireless protocol in ad hoc mode. It too is a broadcast based protocol, with the originator broadcasting the packet to all within 1-hop range. At each device, SAGP uses heuristics to decide whether to retransmit the packet or to inhibit it. The device also calculates whether it is in the geocast region and processes it if so.

SAGP may use three primary heuristics to facilitate a decision to retransmit or suppress (not retransmit). A heuristic, referred to as the M Heuristic may cause retransmission if the device has been heard fewer than M copies of the packet over the air. A heuristic, referred to as the T Heuristic may cause retransmission if the device has only heard copies from devices at least T meters distant. A heuristic, referred to as the CD Heuristic may cause retransmission if the device is closer to the center of the geocast region than any copy previously heard. A rolling random backoff (time delay), starting at time of reception, may be used so that not all devices make their retransmit decisions at once.

Figure 9:
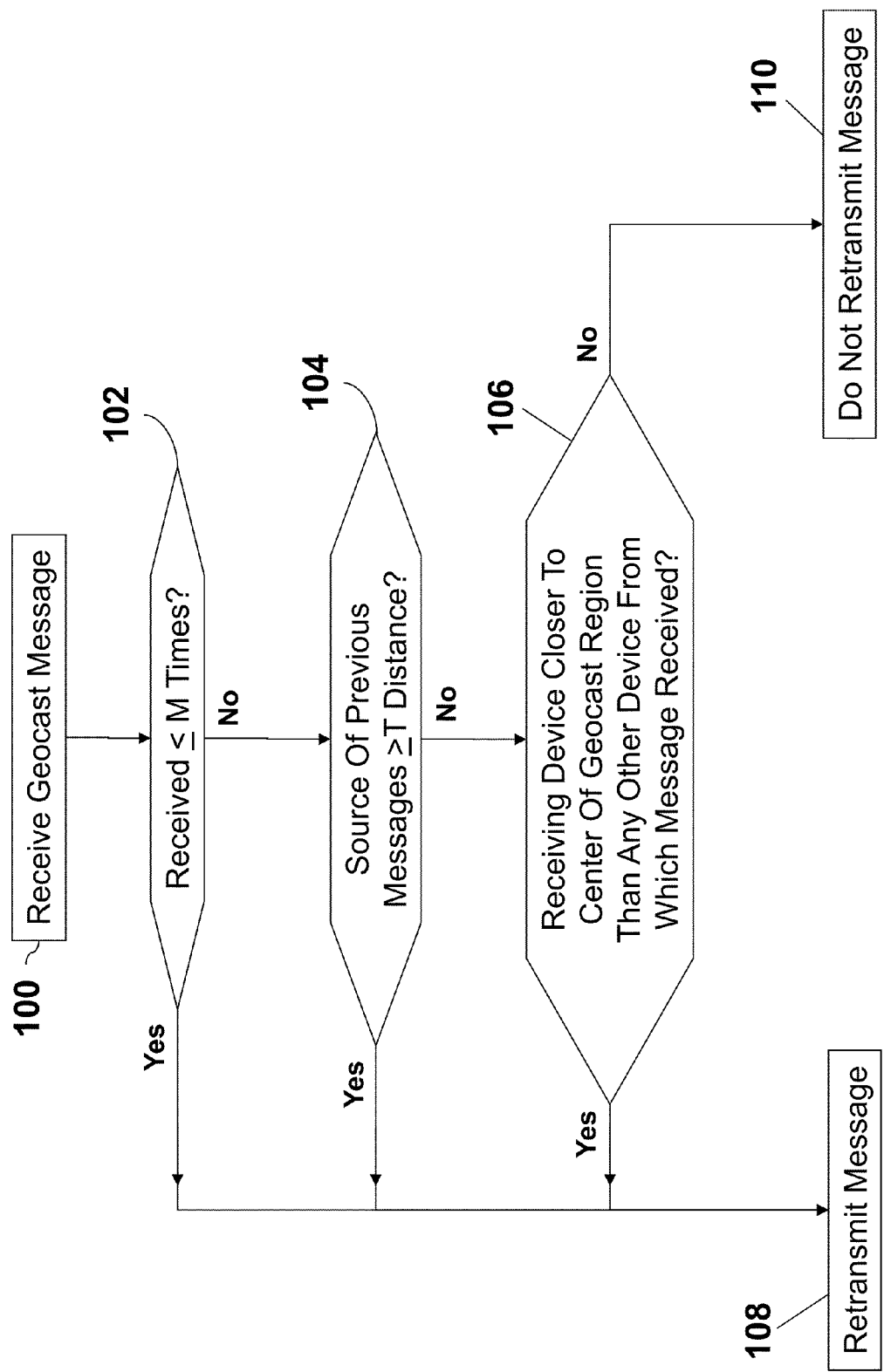
FIG. 9 is a flow diagram of an example process for determining whether to retransmit or not to retransmit a received geocast message.

FIG. 9 is a flow diagram of an example process for determining whether to retransmit or not to retransmit a received geocast message. It is to be understood that the steps of the processes depicted herein are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. Also, it is to be understood that the depicted processes can be ended at any time.

A geocast message may be received by a device at step 100. At step 102, it may be determined if the received geocast message has been received a predetermined number/amount (M) of times. This determination is referred to herein as the M heuristic. The number of copies of each geocast message (e.g., transmissions having the same identifier) received by the device may be counted. If this number is less than or equal to a parameter M (e.g., 2 for example), the device may retransmit (geocast) the received geocast message. The M heuristic may provide an efficient suppression mechanism in dense networks and may make SAGP scalable with node density. The M heuristic may limit the number of transmissions in a local neighborhood, avoiding redundant transmissions and preventing congestion in the network. The M heuristic also may provide redundancy in sparse networks. The M heuristic also may help the propagation get out of local minima it might otherwise be stuck in by hill climbing directly toward the destination. Thus, if it is determined, at step 102, that the geocast message has been received less than or equal to the predetermined amount (M) of times, the message may be retransmitted (geocast) at step 108. If it is determined, at step 102, that the geocast message has not been received less than or equal to the predetermined amount (M) of times, the message may not be retransmitted (geocast). And, the process may proceed to step 104.

At step 104, it may be determined if the source of a geocast message is greater than or equal to a predetermined distance, T, from the receiving device. This determination is referred to herein as the T heuristic. The T heuristic may keep track of how far away each copy of a geocast message is received from (using, for example, the sender location which is included in the geocast packet header). If all previously received copies were sent from devices that were at least a predetermined distance (e.g., 40 meters for example) away, the receiving device may retransmit (geocast) the message. A motivation for implementing the T heuristic is that if a node is sufficiently further away from all previous transmitters of a given geocast, the transmission from this node may have a better chance of reaching nodes around corners than those that are not covered by previous transmitters. As a result, it may help to spread the geocast to distant areas not yet covered. Accordingly, if it is determined, at step 104, that the sources of all previously received copies of the geocast message are greater than or equal to a predetermined distance away, the message may be retransmitted (geocast) at step 108. If it is determined, at step 104, that the sources of all previously received copies of the geocast message are not greater than or equal to a predetermined distance away, the message may not be retransmitted (geocast). And, the process may proceed to step 106.

At step 106, it is determined if the receiving device is closer to a center point of a geocast region than any other device from which the geocast message was received. This determination is referred to as the CD heuristic herein. In an example embodiment, the receiving device may determine a first distance from the receiving device to a point (e.g., the center point) in a geocast region. The receiving device also may determine a plurality of distances between the point and each of a plurality of devices from which the receiving device has previously received a geocast message having an identifier that is the same as an identifier of the received geocast message. The receiving device may retransmit the received packet if the first distance is less than each of the plurality of distances. One of the problems that a geocast scheme may encounter is obstacles. This may be especially true in urban networks where a node/operator may not have a line of sight contact with another vehicle because of obstacles even if they are physically close to each other. The CD heuristic may cause a node to forward a geocast message even if it has heard more than the threshold number of transmissions (M heuristic) from nodes which are within T distance from it. As a result, even if the transmissions from previous transmitters do not help in progressing the geocast message to its destination area (due to obstacles), the transmission from the node may help to forward the message to the destination area Accordingly, if it is determined, at step 106, that the receiving device is closer to a center point of a geocast region than any other device from which the geocast message was received, the message may be retransmitted (geocast) at step 108. If it is determined, at step 106, that the receiving device is not closer to a center point of a geocast region than any other device from which the geocast message was received, the message may not be retransmitted (geocast) at step 108.

Figure 10:
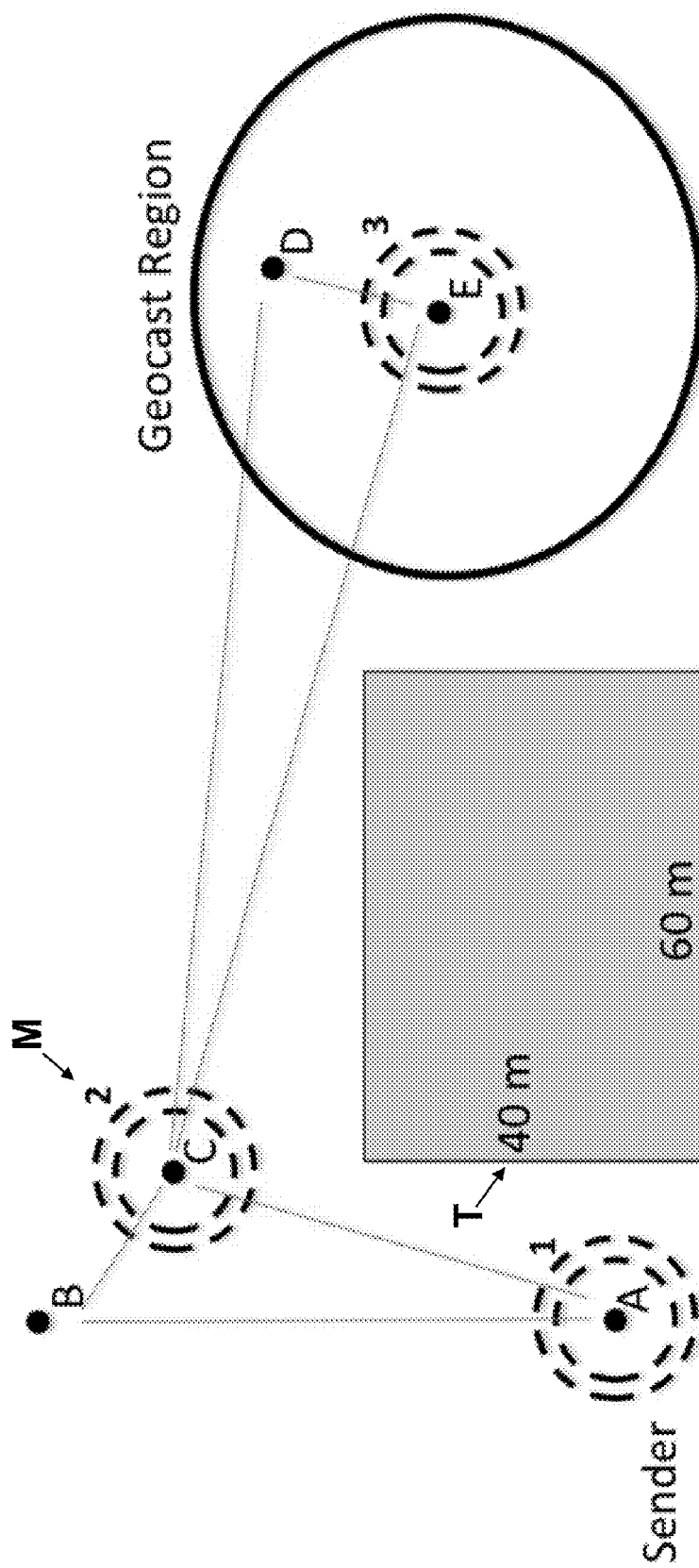
FIG. 10 depicts example propagation of information in accordance with a scalable ad hoc geocast protocol (SAGP).

FIG. 10 depicts example propagation of information in accordance with the herein described scalable ad hoc geocast protocol (SAGP). As depicted in FIG. 10, an example value of M, of the M heuristic, is 2. Also as depicted in FIG. 10, an example value of T, of the T heuristic is, 40 meters. In the example scenario depicted in FIG. 10, sender A transmits first, which is heard by devices B and C. M causes C to retransmit. That is, because the geocast message was received once, and M=2, device C may retransmit the received geocast message. The retransmitted message (retransmitted by device C) is heard by device B, which now suppresses, because M is satisfied. Device C is close enough to satisfy T, and device B is farther from the geocast region than device C. Device C's transmission is heard by device D and device E. Device E retransmits due to action of all three heuristics M, T, and CD. Device D suppresses, as device D has heard the packet twice and from a device both nearby and closer to the center of geocast region. Only three of the five devices retransmit, in contrast with simple flooding, which would have had all devices transmit. When one or more devices are within coverage of a long range network, the tiered geocast routing heuristics may operate to bridge packets to and from the ad hoc Wi-Fi tier, using georouting across the longer range network to connect areas.

In an example embodiment, geocast-based situation awareness may be implemented via a query/response geocast message protocol. Memory of a device (e.g., cache memory) may be used to facilitate scalability. Two message types may be implemented, each sent via geocast. The message type may include a query messages and a response message. Query messages may be sent from a monitorer to the monitored region. Query messages may contain an indication regarding the type of message (e.g., query or response). In an example configuration, a query message may have only an indication of the message type in its payload. The geocast header of the query message may comprise a description of the geocast region, which may comprise the monitored region as well as the location of the monitorer. Query messages may be small in size. For example, a query message, including its header and payload may comprise 130 bytes of information. Response messages may be sent from devices located in the monitored region to an area containing the location of the sender of a query. The payload of a response message may comprise monitored information, including current location, telemetry data, recent movement history, or the like, or any appropriate combination thereof. A response message may be large in size compared to a query message. For example, a response message, including all headers plus payload may comprise 1313 bytes when the maximum movement history is included.

In various example implementation, it may be a goal to include as much recent history as possible in a response message. To help attain this goal, various mechanisms may be included. For example, locations may be spatially filtered. Thus, new fixes (locations) may be recorded only when the new location is sufficiently far (exceeds a predetermined threshold distance) from the prior fix (e.g., the threshold may be 2 meters, 3 meters, etc.). Delta encoding may be used to record tail information. For example, the most recent fix may be expressed (and recorded) in absolute form, and all older fixes may be expressed (and recorded) as the difference between the older fix and the next newer one. In an example embodiment deltas for latitude, longitude, time, distance, etc. may be implemented. Thus, expressing deltas for latitude, longitude, and time in a total of 6 bytes per tail segment would allow up to 192 tail segments in a single response packet.

In an example implementation, a device may monitor one or more regions, MR, with an information round time of P seconds. Note that device operations are described for a single monitored region for the sake of simplicity. These descriptions are not meant to be limiting. Multiple regions may be monitored by a single device. As described herein, operations for monitoring single region may be repeated in order to monitor multiple regions. In an example embodiment, a device may initially clear its recent response cache prior to participating in geocast-based situation awareness. The recent response cache may be any appropriate portion of a device's memory that is used for participation in geocast-based situation awareness. As a monitor, a device may, once every P seconds, geocast a query message to geocast region equal to MR.

When a device receives a query message Q from sender location L, the receiving device may remove all messages from its recent response cache that were created at least P-$\epsilon$ seconds previously. In an example embodiment, $\epsilon$ may be a time constant chosen small compared to P, yet large enough to account for small network and processing delays. For example, in an example illustrative embodiment, P may equal 10.5 seconds and E may equal 0.5 seconds. Next, if no message remains in the recent response cache that was previously sent to a geocast region that includes L, then the receiving device may compose a response message m including the receiving device's current position, movement history, and sensed telemetry data. The receiving device may then geocast m to a target geographic region including L (the location of the source of the query). The receiving device also may record, in its recent response cache, the response message m (or any appropriate portion thereof) and the current time. If L lies within the geocast region of Q (the geographic region of intended reception), then the target geographic region may comprise the geocast region of Q. Otherwise the target geographic region may comprise a circle, or any appropriate polygon, centered on L with radius equal to a parameter k. In an example embodiment, k may be equal to the nominal 1-hop radio range of the device. When a device receives a response message, the device may record the monitored information of the payload in its local data structures for use by a geocast-based situation awareness application.

Figure 11:
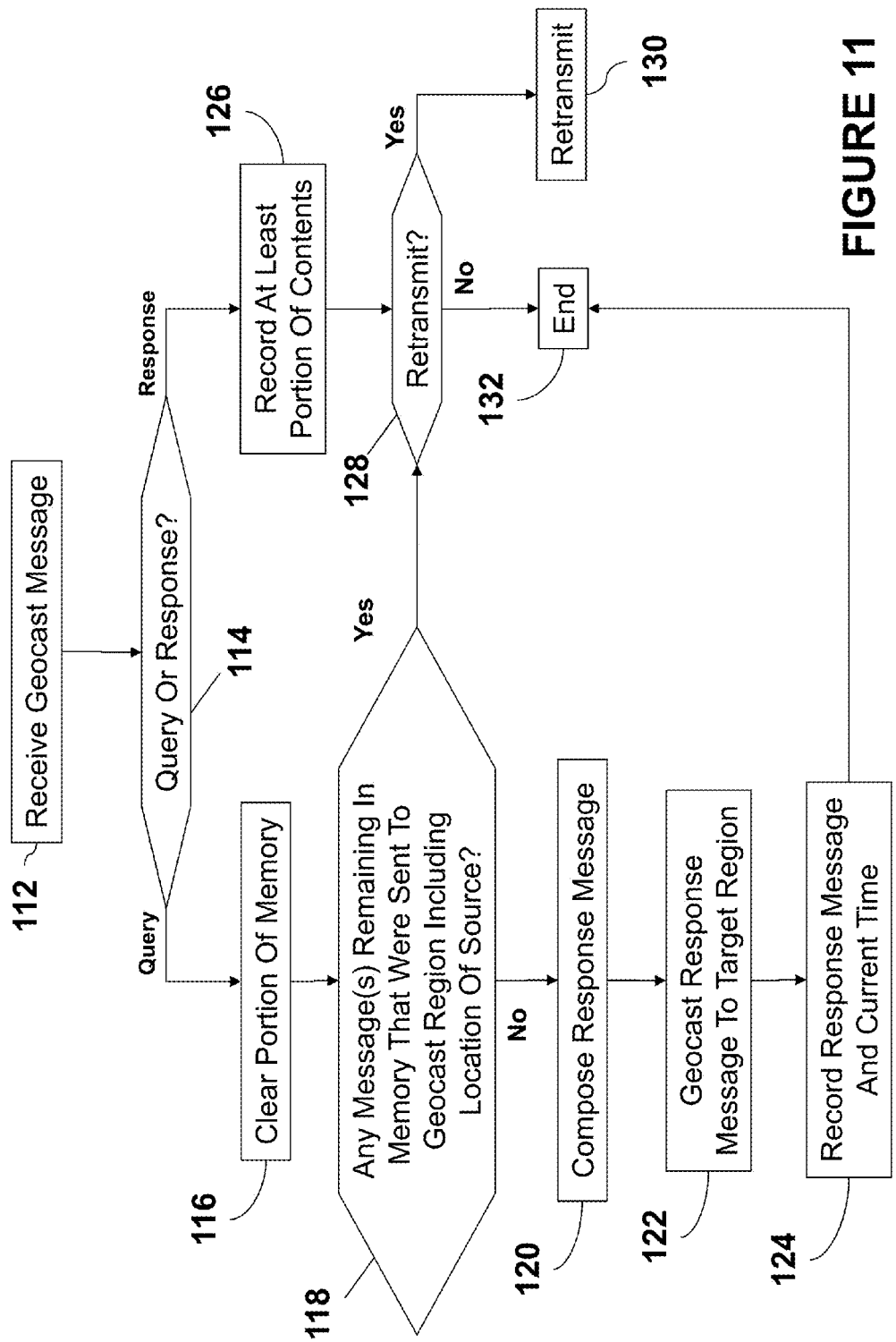
FIG. 11 is a flow diagram of an example process for processing a received geocast message.

FIG. 11 is a flow diagram of an example process for processing a received geocast message. A geocast message may be received at step 112. At step 114, it may be determined if the received geocast message is a query message or a response message.

It is to be understood that the steps of the processes depicted herein are not necessarily presented in any particular order and that performance of some or all the steps in an alternative order is possible and is contemplated. The steps have been presented in the demonstrated order for ease of description and illustration. Steps can be added, omitted and/ or performed simultaneously without departing from the scope of the appended claims. Also, it is to be understood that the depicted processes can be ended at any time.

If it is determined, at step 114, that the received geocast message is a response message, any appropriate portion (as described above) of the received geocast message may be recorded at step 126. It may be determined, at step 128, whether the received geocast message is to be retransmitted. This determination may be may as described above with reference to FIG. 9. If, at step 128, it is determined that the received geocast message is to be retransmitted, the geocast message may be retransmitted, via a geocast protocol (geocast) at step 130. If, at step 128, it is determined that the received geocast message is not to be retransmitted, the process may end at step 132.

If it is determined, at step 114, that the received geocast message is a query message, any appropriate portion (as described above with respect to cache memory) of memory of the receiving device may be cleared at step 126. In an example embodiment, clearing memory comprises removing all messages that were created prior to a predetermined amount of time earlier, such as, for example as described above, messages that were created at least P-$\epsilon$ seconds previously. Thus, all messages that were created prior to a predetermined amount of time earlier than a time at which the geocast message was received may be removed. Clearing a message may be accomplished in any appropriate manner. For example a file containing a message may be completely deleted, a portion of a file containing a message may be deleted, a file containing a message may be marked as deleted, a portion of a file containing a message may be marked as deleted, a file containing a message may be completely overwritten, a portion of a file containing a message may be overwritten, a message may be completely deleted, a portion of a message may be deleted, a message may be marked as deleted, a portion of a message may be marked as deleted, a message may be overwritten, a portion of a message may be overwritten, or the like, or any appropriate combination thereof.

At step 118, it may be determined if, after clearing memory at step 116, there is a message remaining that was sent to the geocast region of the geographic source of the query message. If it is determined, at step 118, that a message is remaining that was sent to the geocast region of the geographic source of the query message, the process may proceed to step 128, and continue as described above.

If it is determined, at step 118, that a message is not remaining that was sent to the geocast region of the geographic source of the query message, a response message may be composed at step 120. The composed message may be geocast to a target geocast region at step 122. The composed message may comprise any appropriate information, such as, for example, a location of the sending device, telemetry data, time information (e.g., current time), a velocity of the sending device, a data item indicating temporal recency of another data item, or the like, or any appropriate combination thereof. As an example of a data item indicating temporal recency of another data item, when encoding a movement history of a device, the following format may be used: <initial_position><initial_time><delta_x, delta_y, delta_t><delta_x, delta_y, delta_t><delta_x, delta_y, delta_t><delta_x, delta_y, delta_t> . . . . Accordingly, delta_x and delta_y may represent *differences* between the next fix and the previous fix in the chain, wherein the first fix may be given indicated by <initial_position> at <initial_time>. Thus, <delta_t> is the time difference between subsequent fixes in the chain. Thus, each <delta_t> value is an example of a data item indicating temporal recency of another data item (the position information).

The target geocast region may be any appropriate region. For example, as described above, if the location of the source of the query message lies within the geocast region of query message (e.g., the region indicated in the header of the message query packet), the target geographic region may comprise the geocast region of the query message. Otherwise the target geographic region may comprise a circle, or any appropriate polygon, centered proximate to the location of the source of the query message. The response message, or any appropriate portion thereof, may be recorded in memory of the device at step 124. In an example embodiment, the current time also may be recorded. The process may end at step 132.

In view of the foregoing, it should be understood, that when a device receives a query at time t, it either responds immediately or the device suppresses due to caching. If the device responds, then the information may be returned to the querier immediately, so the monitorer may have the information within P seconds. The monitorer may send the next query in t+P seconds. If the device suppresses, on the other hand, then it may be because the device sent a response s seconds previously, where s<P, to an area including the monitorer, so the latter has information less than P seconds old for the device up until time t+(P−s). Now, the cached response may be due to a query sent then by some other device M'. At time t+(P−s), M' may send another query, the response to which may refresh the original querier's information for the device for the rest of the period up to t+P. The exception to this is if M' disappears (or stops monitoring) before it sends the next query. In that case, it could be as late as t+P before the original monitorer sends its next query. Thus, in the case of a monitoring device disappearing, the delay as seen by the original monitorer may be up to 2P, but no longer. In an example embodiment, to guarantee a freshness period of P, the monitoring rate may be set to P/2.

A governing factor regarding scalability is the messaging cost over a wireless network. That is, how much of the wireless network is used by the FCOP algorithm for n devices located together in the same wireless reception area, and how does this number increase with n? Each device sends one query message per P seconds and at most one response message per P-$\epsilon$ seconds. If $\epsilon$ is approximated to equal 0, then each device sends one large-payload geocast and one small-payload geocast per P seconds. A question that arises is how many transmissions per geocast are needed by the geocast implementation and how many corresponding bytes per second must be sent. Simple flooding leads to n transmissions per geocast when n devices are present, resulting in $n^2$ transmissions, which breaks down quickly as n increases. SAGP, on the other hand, uses fewer than n transmissions per geocast in dense node layouts, e.g., in scenarios where all devices are within reception range of each other. It turns out that a heuristic governing scaling of SAGP in a single wireless channel in this case is the CD Heuristic, which is equivalent to a probabilistic algorithm for finding the closest device to the center of the geocast region. This operates by halving, on average, the number of candidates remaining after each transmission, thereby requiring (log n) transmissions. Therefore the FCOP Algorithm, when implemented using SAGP, may use a number of transmissions proportional to n log n, where n is the number of devices within a single reception area.

An experiment was conducted in which devices were turned on and carried around long enough for them to fill out their movement histories. The devices then were placed with reception range of each other. Packet transmissions were collected and statistics were compiled. using a capture tool and compiled statistics.

Figure 12:
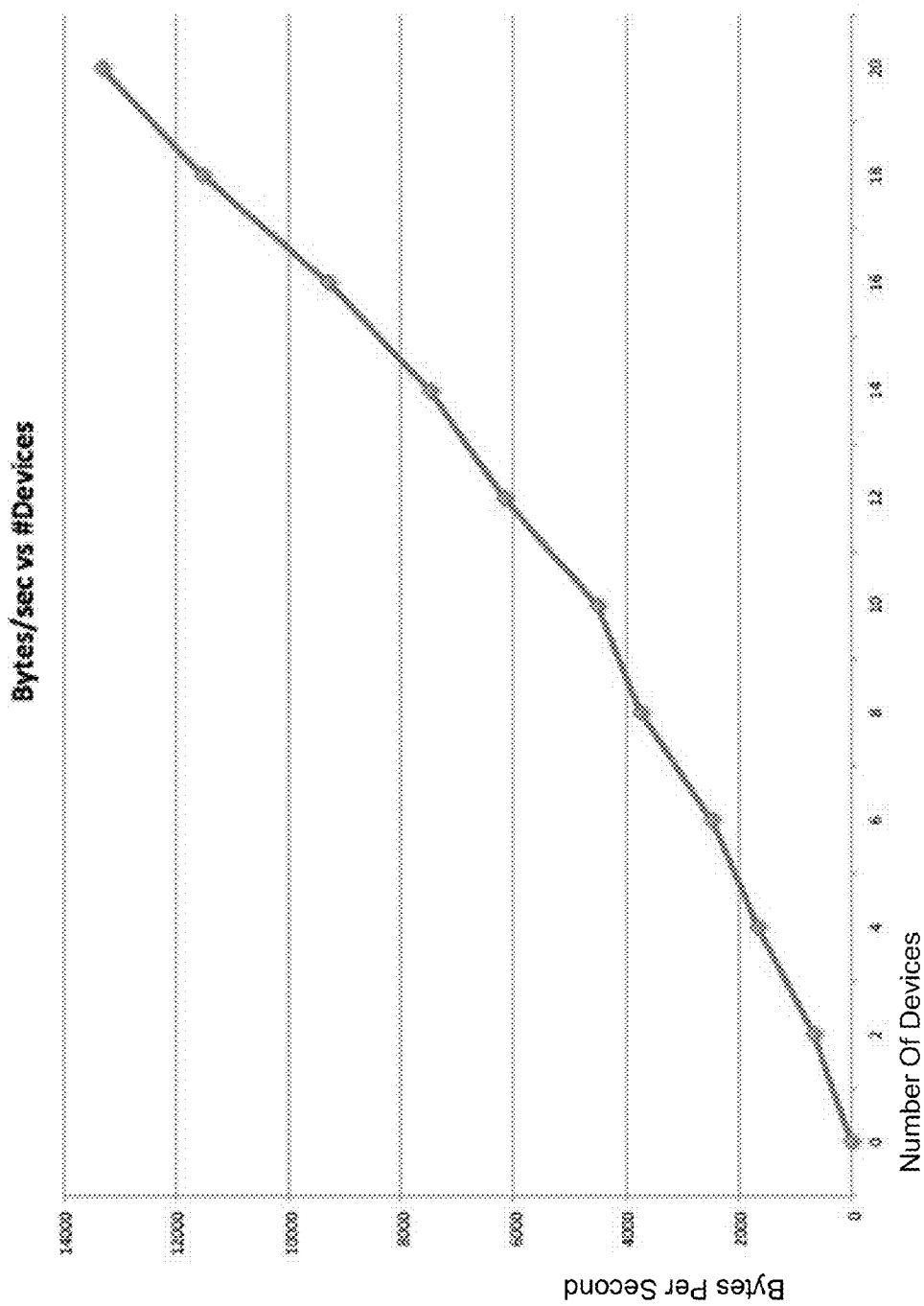
FIG. 12 depicts a graph of results of an experiment utilizing geocast-based situation awareness.

FIG. 12 depicts a graph of the results of the experiment wherein the vertical axis represents bytes per second transferred over the wireless channel and the horizontal axis represents the number of devices participating. The graph of FIG. 12 represent 2 through 20 devices, using P=10.5 seconds.

Figure 13:
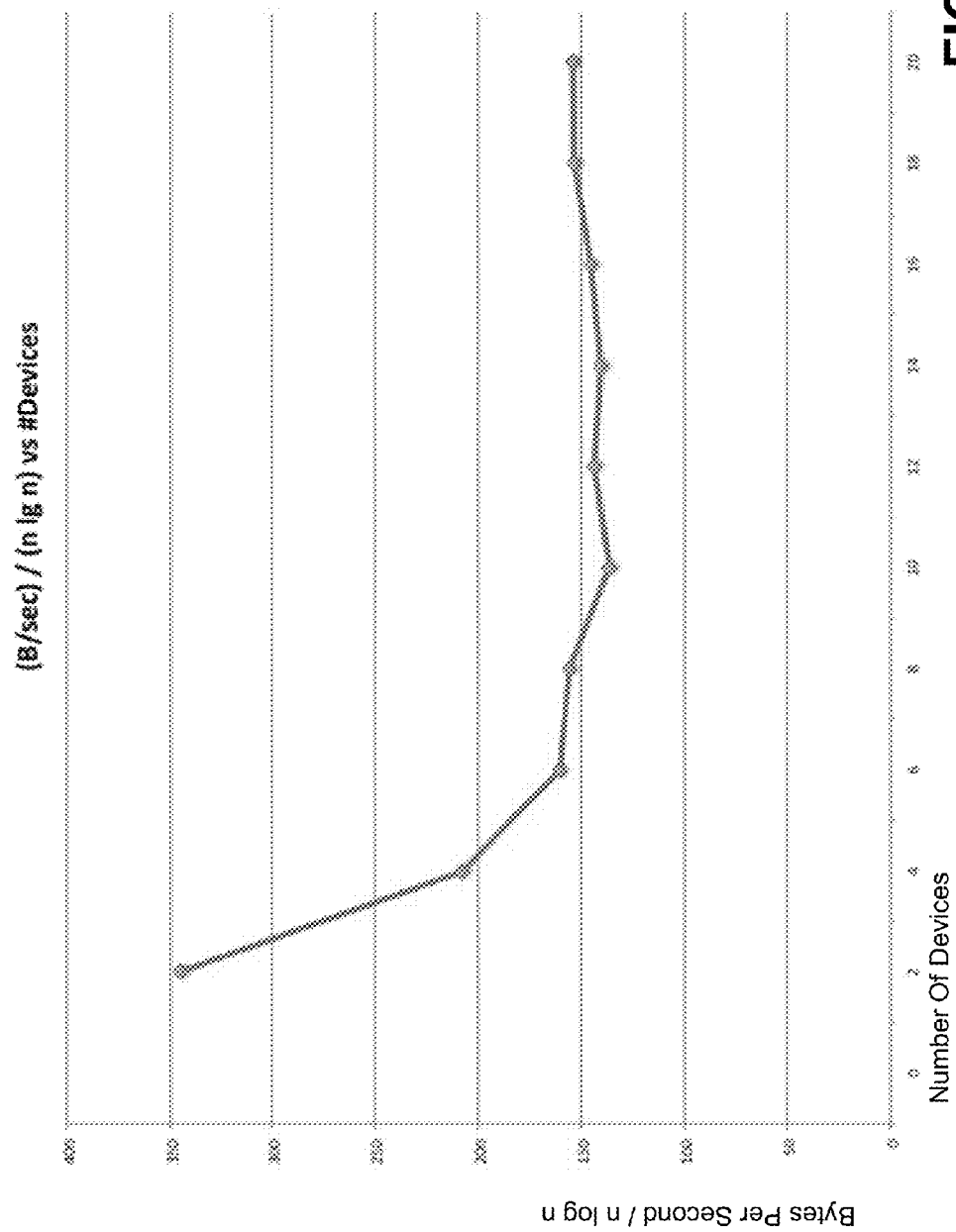
FIG. 13 depicts another graph of results of an experiment utilizing geocast-based situation awareness.

FIG. 13 depicts a graph of the results of the experiment wherein the vertical axis represents bytes per second divided by n log n, and the horizontal axis represents the number of devices participating. The graph of FIG. 13 represent 2 through 20 devices, using P=10.5 seconds. Note that the bytes per second divided by n log n seems to take on a constant value of approximately 154.

The graphs of FIG. 12 and FIG. 13 appear to indicate that the FCOP Algorithm implemented over SAGP has a communication cost of 154n lg (lg means logarithm base 2) n bytes per second. At n=20, this is 13311 bytes per second. Moreover, since geocast may operate using 802.11 broadcasts, this may proceed in a channel at the 802.11 base rate of either 1 Mbps or 2 Mbps. A 1 Mbps channel can accommodate a theoretical maximum of 125000 bytes per second, which would correspond to n~117 devices in a single reception area.

Figure 14:
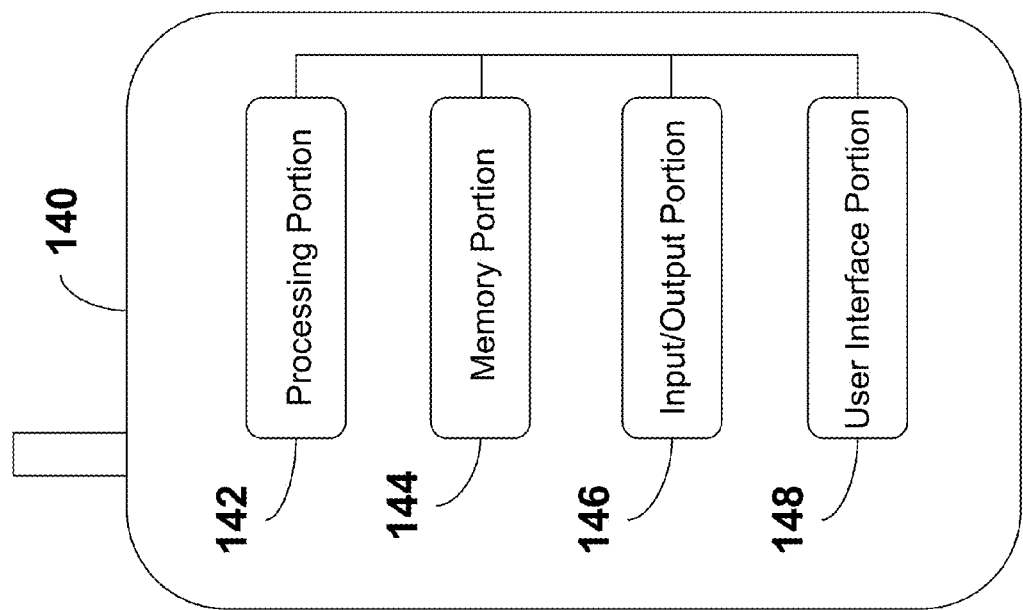
FIG. 14 is a block diagram of an example communications device configured to facilitate geocast-based situation awareness.

FIG. 14 is a block diagram of an example communications device (also referred to as a node, or wireless terminal, WT) 140 configured to facilitate geocast-based situation awareness. In an example configuration, communications device 140 is a mobile wireless device. The communications device 140 can comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a walkman, etc.), a portable navigation device (e.g., GPS compatible device, A-GPS compatible device, etc.), or a combination thereof. The communications device 140 can include devices that are not typically thought of as portable, such as, for example, a public computing device, a navigation device installed in-vehicle, a set top box, or the like. The mobile communications device 140 can include non-conventional computing devices, such as, for example, a kitchen appliance, a motor vehicle control (e.g., steering wheel), etc., or the like. As evident from the herein description, a node, and thus a communications device, is not to be construed as software per se.

The communications device 140 can include any appropriate device, mechanism, software, and/or hardware for facilitating geocast-based situation awareness as described herein. In an example embodiment, the ability to facilitate geocast-based situation awareness is a feature of the communications device 140 that can be turned on and off. Thus, an owner of the communications device 140 can opt-in or opt-out of this capability.

In an example configuration, the communications device 140 comprises a processing portion 142, a memory portion 144, an input/output portion 146, and a user interface (UI) portion 148. Each portion of the mobile communications device 140 comprises circuitry for performing functions associated with each respective portion. Thus, each portion can comprise hardware, or a combination of hardware and software. It is emphasized that the block diagram depiction of communications device 140 is exemplary and not intended to imply a specific implementation and/or configuration. For example, in an example configuration, the communications device 140 may comprise a cellular phone and the processing portion 142 and/or the memory portion 144 may be implemented, in part or in total, on a subscriber identity module (SIM) of the mobile communications device 140. In another example configuration, the communications device 140 may comprise a laptop computer. The laptop computer can include a SIM, and various portions of the processing portion 142 and/or the memory portion 144 can be implemented on the SIM, on the laptop other than the SIM, or any combination thereof.

The processing portion 142, memory portion 144, and input/output portion 146 are coupled together to allow communications therebetween. In various embodiments, the input/output portion 146 comprises a receiver of the communications device 140, a transmitter of the communications device 140, or a combination thereof. The input/output portion 146 is capable of receiving and/or providing information pertaining geocast-based situation awareness as described herein. In various configurations, the input/output portion 146 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 142 may be capable of performing functions pertaining to geocast-based situation awareness as described herein. In a basic configuration, the communications device 140 may include at least one memory portion 144. The memory portion 144 may comprise a storage medium having a tangible physical structure. The memory portion 144 can store any information utilized in conjunction with geocast-based situation awareness as described herein. Depending upon the exact configuration and type of processor, the memory portion 144 may be volatile (such as some types of RAM), non-volatile (such as ROM, flash memory, etc.), or a combination thereof. The mobile communications device 140 may include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 140.

The communications device 140 also may contain a user interface (UI) portion 148 allowing a user to communicate with the communications device 140. The UI portion 148 may be capable of rendering any information utilized in conjunction with geocast-based situation awareness as described herein. The UI portion 148 may provide the ability to control the communications device 140, via, for example, buttons, soft keys, voice actuated controls, a touch screen, movement of the mobile communications device 140, visual cues (e.g., moving a hand in front of a camera on the mobile communications device 140), or the like. The UI portion 148 may provide visual information (e.g., via a display), audio information (e.g., via speaker), mechanically (e.g., via a vibrating mechanism), or a combination thereof. In various configurations, the UI portion 148 may comprise a display, a touch screen, a keyboard, an accelerometer, a motion detector, a speaker, a microphone, a camera, a tilt sensor, or any combination thereof. The UI portion 148 may comprise means for inputting biometric information, such as, for example, fingerprint information, retinal information, voice information, and/or facial characteristic information.

The UI portion 148 may include a display for displaying multimedia such as, for example, tails, tail segments, operators, locations, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the UI portion may comprise a user interface (UI) application. The UI application may interface with a client or operating system (OS) to, for example, facilitate user interaction with device functionality and data. The UI application may aid a user in entering message content, viewing received messages, answering/initiating calls, entering/deleting data, entering and setting user IDs and passwords, configuring settings, manipulating address book content and/or settings, interacting with other applications, or the like, and may aid the user in inputting selections and maneuvers associated with geocast-based situation awareness as described herein.

Although not necessary to facilitate geocast-based situation awareness, a communications device can be part of and/or in communications with various wireless communications networks. Some of which are described below.

Figure 15:
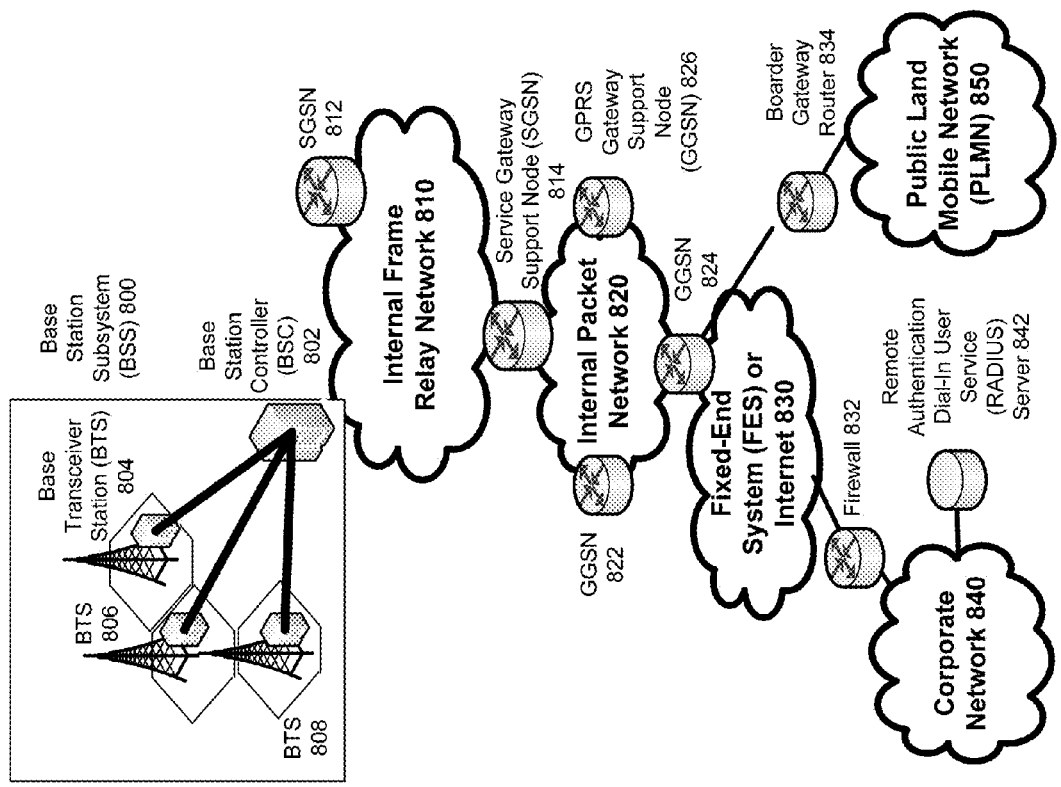
FIG. 15 depicts an overall block diagram of an example packet-based mobile cellular network environment, such as a GPRS network, within which geocast-based situation awareness may be implemented.

FIG. 15 depicts an overall block diagram of an example packet-based mobile cellular network environment, such as a GPRS network, within which geocast-based situation awareness may be implemented. In the example packet-based mobile cellular network environment shown in FIG. 15, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 16:
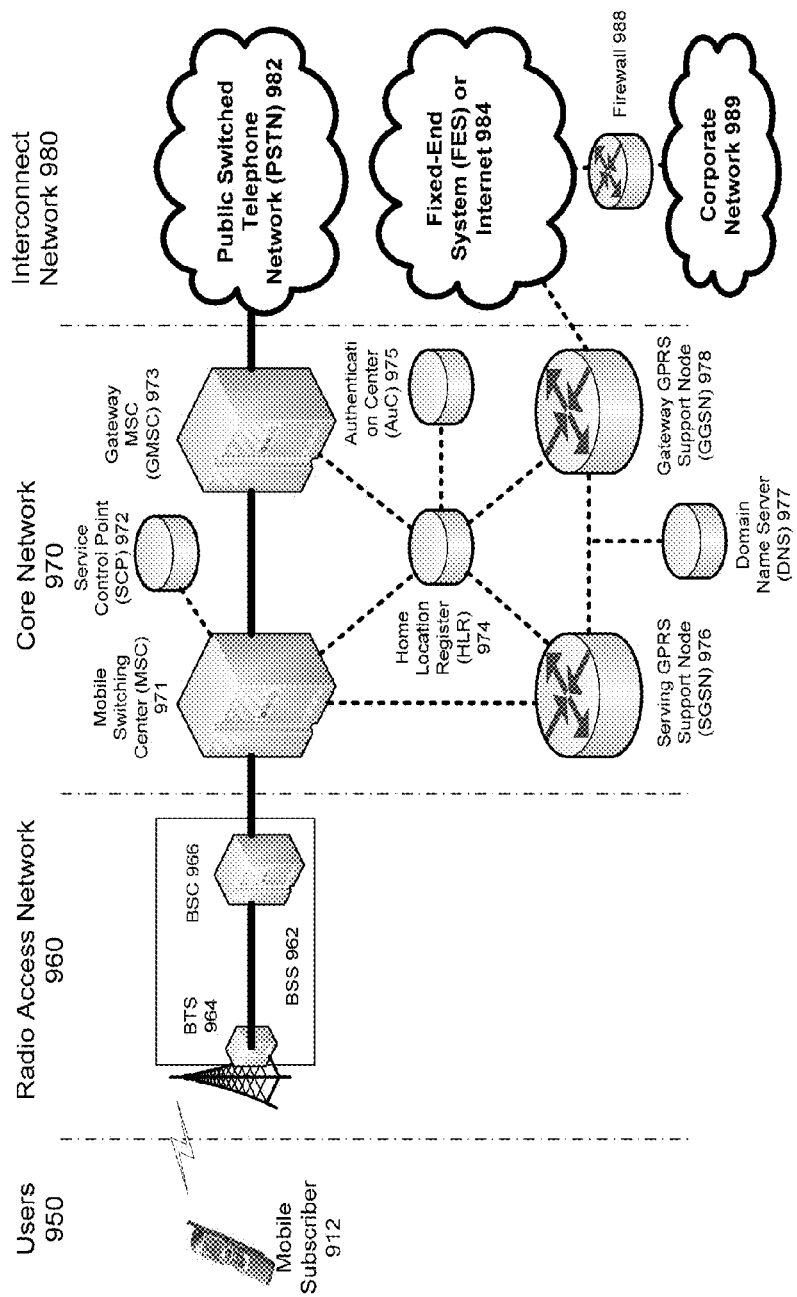
FIG. 16 illustrates an architecture of a typical GPRS network within which geocast-based situation awareness can be implemented.

FIG. 16 illustrates an architecture of a typical GPRS network within which geocast-based situation awareness can be implemented. The architecture depicted in FIG. 16 is segmented into four groups: users 950, radio access network 960, core network 970, and interconnect network 980. Users 950 comprise a plurality of end users. Note, device 912 is referred to as a mobile subscriber in the description of network shown in FIG. 16. In an example embodiment, the device depicted as mobile subscriber 912 comprises a communications device (e.g., communications device 140). Radio access network 960 comprises a plurality of base station subsystems such as BSSs 962, which include BTSs 964 and BSCs 966. Core network 970 comprises a host of various network elements. As illustrated in FIG. 16, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 16, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 16, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 17:
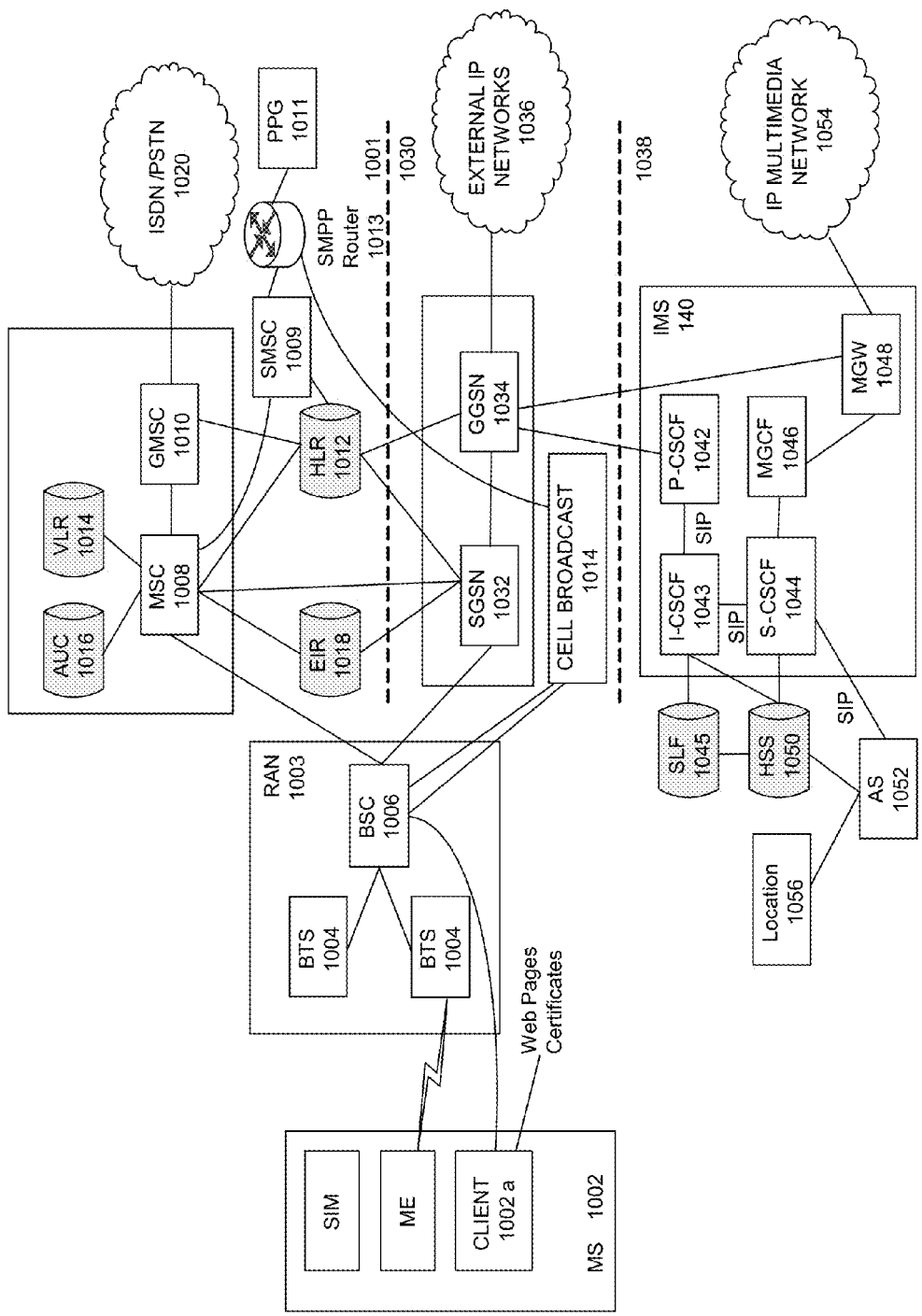
FIG. 17 illustrates an example block diagram view of a GSM/GPRS/IP multimedia network architecture within geocast-based situation awareness can be implemented.

FIG. 17 illustrates an example block diagram view of a GSM/GPRS/IP multimedia network architecture within geocast-based situation awareness can be implemented. As illustrated, the architecture of FIG. 17 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request)

content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 18:
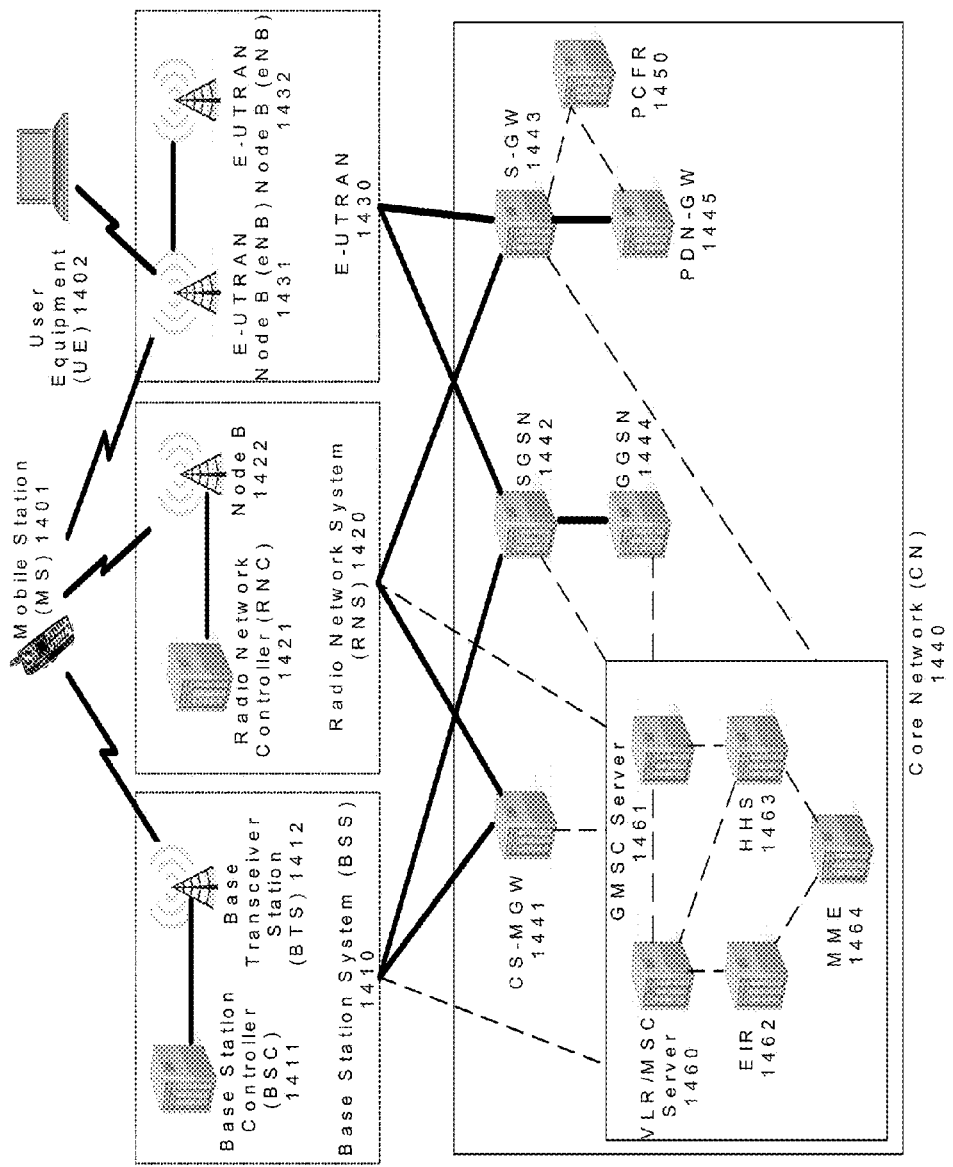
FIG. 18 illustrates a PLMN block diagram view of an example architecture in which geocast-based situation awareness may be incorporated.

FIG. 18 illustrates a PLMN block diagram view of an example architecture in which geocast-based situation awareness may be incorporated. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 18 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of geocast-based situation awareness have been described in connection with various computing devices/processors, the underlying concepts may be applied to any computing device, processor, or system capable of implementing geocast-based situation awareness. The various techniques described herein can be implemented in connection with hardware or software or, where appropriate, with a combination of both. Thus, the methods and apparatuses of geocast-based situation awareness may be implemented, or certain aspects or portions thereof, can take the form of program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is not a transient signal per se. When the program code is loaded into and executed by a machine, such as a computer, the machine becomes an apparatus for implementing geocast-based situation awareness. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for geocast-based situation awareness also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing geocast-based situation awareness. When implemented on a general-purpose processor, the program code combines with the processor to provide a unique apparatus that operates to invoke the functionality of geocast-based situation awareness.

While geocast-based situation awareness has been described in connection with the various embodiments of the various figures, it is to be understood that other similar embodiments can be used or modifications and additions can be made to the described embodiments for geographic based logical message addressing and delivery without deviating therefrom. For example, one skilled in the art will recognize that geocast-based situation awareness as described in the present application may apply to any environment, whether wired or wireless, and may be applied to any number of such devices connected via a communications network and interacting across the network. Therefore, geocast-based situation awareness should not be limited to any single embodiment, but rather should be construed in breadth and scope in accordance with the appended claims.

What is claimed:

1. A method comprising:
   receiving, by a device, a geocast message;
   determining, by the device, if memory of the device comprises a message that was sent to a region containing a geographical source of the received geocast message;
   when it is determined that the memory of the device does not comprise a message was sent to the geographical region containing the geographical source of the received geocast message, composing, by the device, a response message;
   geocasting, by the device, the composed response message; and
   clearing from the memory of the device, based on the received geocast message comprising a query geocast message, all messages that were created prior to a predetermined amount of time earlier than a time at which the geocast message was received.

2. The method of claim 1 wherein the composed response message comprises at least one of:
   a location of a device;
   telemetry data;
   a current time;
   a velocity of a device; or
   a data item indicating temporal recency of another data item.

3. The method of claim 1 wherein the composed response message comprises a movement history of the device.

4. The method of claim 1, wherein the received geocast message comprises at least one of a query geocast message or a response geocast message.

5. The method of claim 1, further comprising:
recording, in the memory of the device, at least a portion of the received geocast message.

6. The method of claim 1, further comprising:
recording, in the memory of the device, at least a portion of the composed response message.

7. The method of claim 1, wherein:
geocasting the composed response message comprises geocasting the composed response message to a target geographic region;
when a location of the geographic source of the received geocast message lies within a geographic region of intended reception of the received geocast message, the target geographic region comprises the geographic region of intended reception of the received geocast message; and
when the location of the geographic source of the received geocast message does not lie within the geographic region of intended reception of the received geocast message, the target geographic region comprises a region centered proximate to the location of the source of the received geocast message.

8. A device comprising:
a processor; and
memory coupled to the processor, the memory comprising executable instruction that when executed by the processor cause the processor to effectuate operations comprising:
receiving a geocast query message;
determining if the memory comprises a message that was sent to a region containing a geographical source of the received geocast message;
when it is determined that the memory does not comprise a message was sent to the geographical region containing the geographical source of the received geocast message, composing a response message;
geocasting the composed response message; and
clearing from the memory of the device, based on the received geocast message comprising a query geocast message, all messages that were created prior to a predetermined amount of time earlier than a time at which the geocast message was received.

9. The device of claim 8 wherein the composed response message comprises at least one of:
a location of a device;
telemetry data;
a current time;
a velocity of a device; or
a data item indicating temporal recency of another data item.

10. The device of claim 8, wherein the composed response message comprises a movement history of the device.

11. The device of claim 8, further comprising recording, in the memory at least a portion of the composed response message.

12. The device of claim 8, wherein:
geocasting the composed response message comprises geocasting the composed response message to a target geographic region;
when a location of the geographic source of the received geocast message lies within a geographic region of intended reception of the received geocast message, the target geographic region comprises the geographic region of intended reception of the received geocast message; and
when the location of the geographic source of the received geocast message does not lie within the geographic region of intended reception of the received geocast message, the target geographic region comprises a region centered proximate to the location of the source of the received geocast message.

13. A computer-readable storage medium having a tangible physical structure, the computer-readable storage medium comprising executable instructions that when executed by a processor cause the processor to effectuate:
receiving a geocast message;
responsive to receiving the geocast message and based on the received geocast message comprising a query geocast message, removing from a memory all messages that were created prior to a predetermined amount of time earlier than a time at which the geocast message was received;
subsequent to removing all messages that were created prior to a predetermined amount of time earlier than a time at which the geocast message was received, determining if a message remains in the memory that was sent to a geocast region of the source of the received geocast message; and
when it is determined that a message remains in the memory that was sent to the geocast region of the source of the received geocast message, composing a response message.

14. The computer-readable storage medium of claim 13, wherein the composed response message comprises at least one of a current time, a movement history of the device, or telemetry data sensed by the device.

15. The computer-readable storage medium of claim 13, wherein the the received geocast message comprises a response geocast message.

16. The computer-readable storage medium of claim 13, further comprising recording, in the memory of the device, at least a portion of the composed response message.

17. The computer-readable storage medium of claim 13, further comprising:
geocasting the composed response message to a target geographic region, wherein:
when a location of the source of the received geocast message lies within a geographic region of intended reception of the received geocast message, the target geographic region comprises the geographic region of intended reception of the received geocast message; and
when the location of the source of the received geocast message does not lie within the geographic region of intended reception of the received geocast message, the target geographic region comprises a region centered proximate to the location of the source of the received geocast message.

* * * * *